(12) United States Patent
Li et al.

(10) Patent No.: US 9,393,542 B2
(45) Date of Patent: Jul. 19, 2016

(54) MULTI-STAGE PLASMA REACTOR SYSTEM WITH HOLLOW CATHODES FOR CRACKING CARBONACEOUS MATERIAL

(75) Inventors: Xuan Li, Beijing (CN); Binhang Yan, Beijing (CN); Changning Wu, Beijing (CN); Yi Cheng, Beijing (CN); Yi Guo, Beijing (CN)

(73) Assignees: National Institute of Clean-and-Low-Carbon Energy, Beijing (CN); Shenhua Group Corporation Limited, Beijing (CN)

( * ) Notice: Subject to any disclaimer, the term of this patent is extended or adjusted under 35 U.S.C. 154(b) by 117 days.

(21) Appl. No.: 14/361,616

(22) PCT Filed: Aug. 3, 2012

(86) PCT No.: PCT/CN2012/079641
§ 371 (c)(1),
(2), (4) Date: Sep. 8, 2014

(87) PCT Pub. No.: WO2013/078880
PCT Pub. Date: Jun. 6, 2013

(65) Prior Publication Data
US 2015/0044106 A1 Feb. 12, 2015

(30) Foreign Application Priority Data
Dec. 1, 2011 (CN) .......................... 2011 1 0393211

(51) Int. Cl.
*B01J 19/08* (2006.01)
*C10J 3/00* (2006.01)
(Continued)

(52) U.S. Cl.
CPC ............ *B01J 19/088* (2013.01); *B01J 19/2415* (2013.01); *C10J 3/00* (2013.01);
(Continued)

(58) Field of Classification Search
CPC ................. B01J 19/088; B01J 19/2415; B01J 2219/0809; B01J 2219/0869; B01J 2219/0871; B01J 2219/0894; B01J 19/26; B01J 2219/00094; B01J 2219/00103; B01J 2219/00108; B01J 2219/00119; B01J 2219/00132; B01J 2219/00159; B01J 2219/00166; C10J 3/00; C10J 3/485; C10J 3/721; C10J 3/78; C10J 3/84; C10J 2200/12; C10J 2300/092; C10J 2300/0946; C10J 2300/0959; C10J 2300/0976; C10B 3/24; C10B 3/34; C10B 31/02; H01M 8/0618; H01M 8/0631; Y02P 20/129
See application file for complete search history.

(56) References Cited

U.S. PATENT DOCUMENTS 3,328,276 A     6/1967  Schmidt et al.
3,622,493 A *  11/1971  Crusco .................. B01J 19/088
                                                    422/186.23
(Continued)

FOREIGN PATENT DOCUMENTS

CN          1562922 A      1/2005
CN        101508623 A      8/2009
(Continued)

OTHER PUBLICATIONS

Baumann, H., et al, "Pyrolysis of Coal in Hydrogen and Helium Plasmas," Fuel, vol. 67, Issue 8, Aug. 1988, pp. 1120-1123.
(Continued)

*Primary Examiner* — Xiuyu Tai
(74) *Attorney, Agent, or Firm* — Senniger Powers LLP

(57) ABSTRACT

Disclosed is a multi-stage plasma reactor system with hollow cathodes for cracking carbonaceous material with each stage comprising: hollow cathodes and hollow anodes cooled by recycling cooling medium or refrigerant; working gas inlet (s); inlet(s) of carbonaceous material and carrier gas as feedstock; reaction tubes in connection with the anode or cathode, in addition, the reactor system also comprises: at least one inlet(s) of quench medium located lower portion of last one of the reaction tubes; and at least one outlet(s) of quenched products and gases located on bottom or lower portion of last one of the reaction tubes, wherein chambers are formed between the first hollow cathode or the hollow cathode used as the reaction tube of any stage and the anode so as to generate plasma gas and/or electric arc therein, generated plasma gas jet fully contacts and efficiently mixes with the carbonaceous material and carrier gas as feedstock and/or volatiles caused by pyrolysis within or nearby highest temperature region of the chambers, and pyrolysis of the carbonaceous material and/or gas-phase reaction of volatiles are occurred. The present reactor system has excellent energy efficiency and higher cracked products yield.

20 Claims, 10 Drawing Sheets

(51) Int. Cl.
*C10J 3/48* (2006.01)
*C10J 3/72* (2006.01)
*C10J 3/78* (2006.01)
*C10J 3/84* (2006.01)
*B01J 19/24* (2006.01)

(52) U.S. Cl.
CPC ............... *C10J 3/485* (2013.01); *C10J 3/721* (2013.01); *C10J 3/78* (2013.01); *C10J 3/84* (2013.01); *B01J 2219/0809* (2013.01); *B01J 2219/0869* (2013.01); *B01J 2219/0871* (2013.01); *B01J 2219/0894* (2013.01); *C10J 2200/12* (2013.01); *C10J 2300/093* (2013.01); *C10J 2300/0946* (2013.01); *C10J 2300/0959* (2013.01); *C10J 2300/0976* (2013.01); *C10J 2300/1238* (2013.01); *C10J 2300/1807* (2013.01)

(56) References Cited

U.S. PATENT DOCUMENTS

| | | | |
|---|---|---|---|
| 4,358,629 A | 11/1982 | Kim | |
| 4,367,363 A | 1/1983 | Katz et al. | |
| 4,536,603 A | 8/1985 | Sprouse et al. | |
| 4,588,850 A | 5/1986 | Mueller et al. | |
| 4,801,435 A * | 1/1989 | Tylko | B01J 19/088 219/121.36 |
| 6,395,197 B1 * | 5/2002 | Detering | B01J 19/088 252/373 |

FOREIGN PATENT DOCUMENTS

| | | |
|---|---|---|
| CN | 101742808 A | 6/2010 |
| CN | 103100365 A | 5/2013 |
| WO | 2004048851 A1 | 6/2004 |
| WO | 2009058631 A1 | 5/2009 |
| WO | 2010095980 A1 | 8/2010 |

OTHER PUBLICATIONS

Beiers, H-G., et al., "Pyrolysis of some Gaseous and Liquid Hydrocarbons in Hydrogen Plasma," Fuel, vol. 67, Issue 7, Jul. 1988, pp. 1012-1016.

* cited by examiner

MULTI-STAGE PLASMA REACTOR SYSTEM WITH HOLLOW CATHODES FOR CRACKING CARBONACEOUS MATERIAL

REFERENCE TO CORRESPONDING APPLICATIONS

This application is the 371 National Stage Application based on International PCT Application No. PCT/CN2012/079641, filed Aug. 3, 2012.

FIELD OF INVENTION

The invention relates to an energy efficient equipment and process for cracking carbonaceous material with volatiles content to produce a high yield of cracked products, especially to a multi-stage plasma reactor system with hollow cathode for cracking carbonaceous material as well as a process for cracking carbonaceous material by using the multi-stage plasma reactor system, more particularly, also to a process for producing acetylene by using the multi-stage plasma reactor system.

PRIOR ART

Conventionally, carbonaceous materials, together with other components such as hydrogen, are heated by an electric arc device or other suitable sources of heat which are well known to those skilled in the art so as to be cracked or pyrolyzed. The composition that is produced as a result of the decomposition of the carbonaceous matter will depend on the reaction conditions existing in the decomposition or reaction zone. It is well-known that the formation of certain compositions is favored under specified reaction conditions. For example, the formation of acetylene as an intermediate product is favored where the temperature of the reaction zone is above 1300 K. The formation of acetylene relative to the simultaneous decomposition of acetylene is also favored at or near 1300 K.

Generally, where an electric arc is applied as a heat source, the electric arc passes through the gas, for example hydrogen gas, causing temperature of the gas to increase to extremely high temperatures in a very short time. Arc column temperatures commonly reach 8,000 K to 20,000 K. The gas on leaving the arc is commonly within the neighborhood of 2,000-5,000 K. Under these conditions, the gas molecule such as hydrogen molecules may dissociate partially into hydrogen atoms even $H^+$ or $H^-$, therefore generating plasma high temperature gas.

Once plasma high temperature gas, such as plasma hydrogen, leaves the electric arc, there is an extremely rapid tendency for the plasma gas atoms or ions, for example hydrogen atoms to recombine into molecules, and if doing so, they give off tremendous amounts of heat. A portion of this heat, in addition to the sensible heat of the plasma gas, is absorbed by the carbonaceous material particles which are adjacent to or contact with the plasma gas atoms or ions, mostly via conduction, convection and radiation, thereby causing the carbonaceous material particle to be pyrolyzed and/or cracked or compose and more specifically to give off its volatile content, i.e., to devolatilize.

It is also well-known and established that steps and conditions of which the above decomposition and devolatilization of the carbonaceous material will vary greatly with the type of the carbonaceous materials. Heretofore, gaseous and liquid carbonaceous materials were the favored feedstocks, as there was no known way of producing a high yield of cracked products, for example acetylene, at reasonable costs from solid carbonaceous materials. Also gaseous and liquid feedstocks were easier to be processed, and produced less wear and tear on the arc apparatus.

On the other hand though the basic process steps are known, it is possible that the mechanics and the kinetics of the process, for example, were not understood well enough, heretofore, to teach one how to maximize the yield of some specific cracked products, for example acetylene from solid carbonaceous matter in an energy efficient manner.

There have been a lot of attempts and experiments on the improvements of devices and processes aimed to maximize the yield of some specific cracked products from solid carbonaceous matter in the prior art.

For example, U.S. Pat. No. 3,328,276 disclosed a method for production of a plasma beam suitable for effecting cracking reaction which comprises passing a stream of a hydrogen—hydrocarbon gas mixture containing from 6-25 hydrogen atoms for each carbon through a hollow cooled cathode and through a direct current vortex-stabilized arc maintained between said cathode and a hollow cooled anode and passing a stream of hydrogen through a vortex chamber surrounding said arc, wherein the ratio of operational voltage, expressed in volts to the operational current, expressed in amperes, of said arc ranges between 5 and 15. The cracked products stream produced by the above method contains 14.8 volume % acetylene.

U.S. Pat. No. 4,358,629 disclosed a method of conversion by way of decomposing a solid carbonaceous matter to acetylene. Specifically, this patent taught selecting the operating conditions which will produce high yield at low cost. In this patent, specific values of heat and enthalpy for the carbonaceous matter and the gas are proposed in combination with specific particle sizes and reaction time. All of the foregoing contributes to producing acetylene at a commercially competitive cost.

In fact, U.S. Pat. No. 4,358,629 described an electric arc reactor including four zones in turn along with the solid carbonaceous material motion direction, i.e., the solid carbonaceous material powder dispersion zone, arc zone, reaction zone, and quench zone. Because of the ultra-short residence time of the powder in the arc zone and the temporary thermal inertia of the powder at that time, temperature of the powder kept certainly close to its inlet temperature while the gas going through reached a high temperature up to 8000 K. The solid carbonaceous material powder could only be heated in the reaction zone by the heated stream through conduction and convection. In this way, all electricity input from the thin arc zone, i.e. a large amount of energy enough to raise the powder temperature to above 1800 K, led to unreasonable over-aggregation of energy and inevitable exposure of over-concentrated heat to the reactor wall thereby causing overheating of the wall. The heat essentially removed from the neighbor of the wall for protection of the wall accounts for about half of the total electricity input, as a result, a lot of valuable energy had to waste out. Furthermore, the extreme high temperature occurrence on the specific region greatly challenged the design of the reactor wall structure, selection of the wall material, as well as made the wall protection in big troubles.

Pyrolysis of Coal in Hydrogen and Helium Plasma (Baumann, H., Bittner, D., Beiers, H. G., Klein, J. & Juntgen, H, Fuel, 1988, Vol. 67, pp 1120-1123, August) and Pyrolysis of Some Gaseous and Liquid Hydrocarbons in Hydrogen Plasma (Beiers, H. G., Baumann, H., Bittner, D., Klein, J. and Juntgen, H, Fuel, 1988, Vol. 67, pp 1012-1016, July) disclosed one apparatus, consisting of a plasma generator and a plasma reactor, which was described to carry out the pyrolysis of coal or gaseous and liquid hydrocarbons. In this apparatus, high-temperature stream is generated in a plasma generator with a mean temperature of 3300 K at outlet, and then fed into the reaction tube as reactor from its top entrance. The dried coal powder or gaseous and liquid hydrocarbons are injected into the reaction tube from its side entrance close to the top entrance, where the cold coal powders was estimated to be well mixed with the above hot plasma jet. However, due to the high-speed moving downward of the plasma jet and thereby forming strong obstacle to fluid-powder mixing, so that the contact and thermal transfer efficiency between the coal powder and plasma stream is weakened with negative effect on the reactor performances while such reactor structure and arrangement of feeding caused the caking phenomenon hardly be avoided due to the coal powder or gaseous and liquid hydrocarbons continuously flushing and striking on the wall surface.

CN1562922 disclosed a reactor similar to that described in the above articles but introduced argon gas sprayed onto inner wall of the reaction tube so as to prevent the inner wall of reaction tube from caking. However, the reactor disclosed in this patent document has still not overcome all of the above identified shortcomings.

U.S. Pat. No. 4,536,603 disclosed a process wherein coal was reacted with a hot gas stream to produce acetylene. The process comprised the sequential steps of reacting a fuel, oxygen and steam under controlled conditions of temperature to produce a hot gas stream principally comprising hydrogen, carbon monoxide and steam along with minor amounts of carbon dioxide, and essentially free of O, OH and $O_2$. The hot gas stream is accelerated to a high velocity and impinged upon a stream of particulate bituminous or sub-bituminous coal and thereafter the mixture of hot gas and coal is decelerated to a velocity of from about 150 to 300 feet/second. The amounts of the streams of particulate coal and hot gas are controlled to produce in the reaction zone a pressure in the range of from about 10 to 100 Pisa and a temperature of from about 1800 to 3000° F. The mixture of coal and hot gas is maintained at that pressure and temperature for a time of from about 2 to 30 milliseconds to produce a product stream including char and acetylene. The temperature of the product stream is then reduced to less than about 900° F. in a time of less than about 2 milliseconds to substantially arrest any further reactions and the acetylene is recovered therefrom. The char is recovered and used as at least a part of the fuel used to produce hot gas.

U.S. Pat. No. 4,588,850 disclosed a method for manufacturing acetylene and synthesis or reduction gas from coal by means of an electric arc or plasma process, wherein coal converted into powder form is pyrolyzed in an electric arc reactor with an energy density of 1 to 5 kWh/Nm³, a residence period of 0.5 to 10 millisecond and at a temperature of at least 1500° C. such that amount of the gaseous compounds derived from the coal do not exceed 1.8 times of that of the so-called volatile content of the coal. The coke remaining after subsequent quenching is then fed to a second electric arc reactor in which the coke, by means of a gasifying medium in conjunction with heating by means of an electric arc or plasma process, is converted into synthesis or reduction gas with a residence period of 1 to 15 sec and at a temperature of at least 800° C. The gas flow from the pyrolysis zone is cleaned and acetylene is recovered therefrom by selective solvents. The gas from the cleaning step is similarly cooled and cleaned CN101742808 disclosed a high-power V-shaped plasma generator being capable of displacing the conventional line-shaped plasma generator, and proclaimed to have relatively low energy consumption and convenient operation conditions. The V-shaped plasma generator could be applied to generate variety of plasma high temperature gases, for example plasma hydrogen and inert gases.

U.S. Pat. No. 4,367,363 disclosed a process related to the recovering of pure acetylene from the gaseous out-put stream from a coal to acetylene conversion process. The gaseous out-put stream is initially treated in an acid gas removal stage by absorbing HCN and $H_2S$ in an organic solvent such as N-methyl pyrrolidone and scrubbing with a caustic agent such as NaOH to remove $CO_2$. In a second stage, the gaseous out-put stream is scrubbed with the organic solvent to provide a sweet gas treatment and separate pure acetylene as a product. In a third stage, the gases deriving from second stage are first hydrogenated, then desulfurized and then methanated. The out-put stream from the third stage is recycled to the coal to acetylene conversion process. In a fourth stage, the organic solvent from said second stage is refined and recycled to the first stage and/or second stage.

The disclosures of all above-mentioned reference documents are incorporated herein in entirety by references.

In the above introduction and description of prior art, it is apparent to those skilled in the prior art that present reactor for cracking or decomposing carbonaceous material exits a lot of defects needed to urgently addressed. For example, the structure of the present reactor could not allowed to make freely such adjustment as it needs to increase or optimize the reaction temperature and/or time of the carbonaceous material powder and freely lengthen the height of the prior single-stage reactor according to the reaction temperature as requested by the maximum yield of cracked products, for example acetylene. The rapid drop of hot stream temperature along the present reactor longitudinal direction results in that the reacting jet flow must be quenched to maximize the cracked products yield in a relatively short moving distance and hence the carbonaceous material to cracked products conversion is greatly limited. Meantime as previously stated, serious energy waste and over-high temperature distribution in neighbor of reactor inner wall also are big technical problems not to allow being ignored. in the plasma reactors and cracking methods disclosed in the above all prior documents references, the region where carbonaceous material contacts and mixes with plasma stream always kept away from the highest temperature region caused by electric arc, this fact would result in the consequence that thermal transfer efficiency is greatly reduced, and hence operational temperature of carbonaceous material pyrolysis, i.e. devolatilization and the temperature of following gas phase reaction of volatiles were greatly decreased, thereby the yield of cracked products is apparently lowered, as well as energy efficiency of the reactor correspondingly dropped while it is also possible that overheating on reactor wall or neighbor thereof and energy waste were caused.

The following description represents a new understanding of the reactor and process directed specifically to thermal decomposition of solid carbonaceous materials having volatile content to maximize the yield of some specific cracked products from the solid carbonaceous matter. At the same time, the necessary process parameters are further provided for heating the solid carbonaceous particles as fast as possible to decompose the particle releasing volatiles as fast as possible so as to avoid the char forming by secondary reactions of these volatiles in the solid carbonaceous particles.

On the basis of above analysis, via numerous attempts and experiments, the inventors finally invented a new apparatus for cracking or decomposing solid carbonaceous material almost solving all of above mentioned defects, for example realizing highly fully contact and efficient mixing between carbonaceous material fine powder and plasma stream within or nearby highest temperature region near electric arc column, i.e. multi-stage plasma reactor system with hollow cathodes, which of working mechanism is much different from fluid-powder mixing concept in present plasma reactor system.

SUMMARY OF THE INVENTION

In accordance with the first aspect of the present invention, there is provided a multi-stage plasma reactor system with hollow cathode for cracking carbonaceous material with each stage comprising:
hollow cathode and anode cooled by recycling cooling medium or refrigerant, wherein chamber is formed between the hollow cathode and the anode, and at least portion of first hollow cathode is positioned within inner space of the first anode;
inlet(s) of working gas between outer surface of the hollow cathode or anode and interior surface of the hollow anode or cathode so as for the working gas to enter the chamber;
inlet(s) of carbonaceous material and carrier gas as feedstock located in one end of the hollow cathode or anode into the chamber, wherein hollow passage of the hollow cathode or anode is applied to deliver the carbonaceous material and carrier gas as feedstock and/or volatile caused by pyrolysis which goes through the above hollow passage into the chamber via the inlet(s) of carbonaceous material and carrier gas as feedstock;
reaction tube in connection with the hollow anode or cathode, and
the reactor system also comprising:
at least one inlet(s) of quench medium for quenching or freezing of reaction products located lower portion of last one of the reaction tubes; and
at least one outlet(s) of quenched products and gases located on bottom or lower portion of last one of the reaction tubes;
wherein plasma gas and/or electric arc is generated in the chamber formed between first hollow cathode or the hollow cathode of any stage, used as the reaction tube of next up stage and the hollow anode, the working gas goes through electric arc forming region between the hollow cathode and anode so as to generate plasma gas which then fully contacts and efficiently mixes with the carbonaceous material and carrier gas as feedstock and/or volatile caused by pyrolysis, entering the chamber by going through the hollow passage of the hollow cathode within or nearby highest temperature region of the above chamber, and pyrolysis of the carbonaceous material and gas-phase reaction of the volatile occur.

In accordance with the second aspect of the present invention, there is provided a multi-stage plasma reactor system with hollow cathode for cracking carbonaceous material with each stage comprising:
hollow cathode and anode cooled by recycling cooling medium or refrigerant, wherein chamber is formed between the hollow cathode and anode, first hollow cathode is dual hollow cathodes that one of the dual hollow cathodes lies hollow passage of another of the dual hollow cathodes, an annulus gap is formed between both of the dual hollow cathodes, and at least portion of the dual hollow cathodes is positioned within inner space of the first hollow anode;
inlet(s) of working gas between outer surface of the hollow cathode or anode and interior surface of the hollow anode or cathode so as for the working gas to enter the chamber;
inlet(s) of carbonaceous material and carrier gas as feedstock located in one end of the hollow cathode or anode into the chamber, wherein the hollow passage of the hollow cathode or anode, or the annulus gap of the dual hollow cathodes is applied to deliver the carbonaceous material and carrier gas as feedstock and/or volatiles caused by pyrolysis which goes through the above annulus gap or hollow passage into the chamber via the inlet(s) of carbonaceous material and carrier gas as feedstock;
reaction tube in connection with the hollow anode or cathode, and
the reactor system also comprising:
at least one inlet(s) of quench medium for quenching or freezing of reaction products located lower portion of last one of the reaction tubes; and
at least one outlet(s) of quenched products and gases located on bottom or lower portion of last one of the reaction tubes;
wherein plasma gas and/or electric arc is generated in the chamber formed between one of dual hollow cathodes of first stage or the hollow cathode of any stage, used as the reaction tube of next up stage and the hollow anode, the working gas goes through electric arc forming region between the above hollow cathode and the anode so as to generate plasma gas which then fully contacts and efficiently mixes with the carbonaceous material and carrier gas as feedstock and/or the volatiles caused by pyrolysis, entering the chamber by going through the above annulus gap or the hollow passage of the hollow cathode within or nearby highest temperature region of the above chamber, and pyrolysis of the carbonaceous material and gas-phase reaction of the volatile occur In the above mentioned plasma reactor system according to first and/or second aspect of the present invention, it is preferred that the closest horizontal distance between the outer surface of the hollow cathode or any one of the dual hollow cathodes and the interior surface of the anode ranges within 1-400 mm while the closest distance between the bottom of outer surface of the hollow cathode or any one of the dual hollow cathodes and the interior surface of the anode ranges within 1-400 mm, more preferably 1-15 mm; angle formed between interior surface of side wall of the anode and that of bottom wall of the anode ranges within 90°-160°, more preferably 105°-145°; at least portion of outer surface of the hollow cathode, each of the dual hollow cathodes and/or the anode is cooled by recycling cooling medium or refrigerant with inlets and/or outlets of cooling medium or refrigerant there nearby; the hot gas preheating the carbonaceous material and carrier gas as feedstock, entering the annulus gap or inmost hollow passage of the dual hollow cathodes, reaches temperature of 100° C.-1000° C.; Lower end of the hollow cathodes and anodes, annulus gap or inmost hollow passage of the dual hollow cathodes is in connection with material flow distributor so as to adjust flowing rate or direction of the carbonaceous material and carrier gas as feedstock, volatiles caused by pyrolysis, working gas and hot gas preheating the carbonaceous material and carrier gas as feedstock.

It is also preferred that temperature of the highest temperature region of first the chamber makes sure that the temperature of the carbonaceous material entering therein or nearby or into first reaction tube reaches 650-1250° C. while temperature of the highest temperature region of other the chambers makes sure that temperatures of the volatiles caused by pyrolysis after entering other the reaction tubes reaches 1500-2900° C.; the working gases become high temperature plasma gases of hydrogen, nitrogen, methane, and/or inert gas after passing through electric arc forming region; the hot gas preheating the carbonaceous material and carrier gas as feedstock is $H_2$, $N_2$, methane, inert gas and/or plasma gases of $H_2$, $N_2$, methane, and/or inert gases; the quench media entering last one of said reaction tubes makes sure that the reaction products therein are quenched to below temperature of 527° C. before exiting said reaction tube; residence time of the carbonaceous material and/or volatiles caused by pyrolysis in every stage of the reactor system is 0.4-4 millisecond; total time for pyrolysis of the carbonaceous material, gas phase reaction of volatiles, and quench of cracked products occurring in said reactor system is less than 50 millisecond; said quench media includes water, steam, propane, aromatics, inert gas, any types of carbonaceous material and/or mixture thereof; said carrier gas is selected from group consisting of hydrogen, nitrogen, methane, gaseous carbonaceous material, inert gas and/or mixture thereof; cross section shape of said cathode, anode and/or the reaction tube is round, square, elliptic, polygonal or any regular shape else; cross section surface ratio of upper end and lower end of the reaction tube is 1/1-1/3.

It is still preferred that amount of the inlets of the carbonaceous material and carrier gas as feedstock at every stage of the reactor system is 1-32, amount of the inlets of the working gas at every stage of the reactor system is 2-32 while amount of the inlets of quench media is 2-64 and amount of the inlets of the hot gas preheating the carbonaceous material and carrier gas as feedstock is 1-32, said inlets are symmetrically and/or oppositely arranged in the horizontal direction.

The carbonaceous material is selected from group consisting of coal, coal tar, coal direct liquefaction residue, heavy crude residuum, char, petroleum coke, tar sand, shale oil, carbonaceous industrial wastes or tailings, biomass, synthetic plastic, synthetic polymer, spent tire, municipal solid waste, bitumen, and/or mixture thereof; the power input of the hollow cathode, any one of dual hollow cathodes and/or anode ranges within 10 kW-20 MW so as to form electric arc generating plasma gas; the inlets of the working gases and/or quench medium are centrally symmetrically arranged in horizontal direction; angle formed by the inlets of the quench medium is in range of from −45° to +45° in horizontal direction; both opposite or non-direct opposite the inlets of the quench medium, on the same horizontal level, form an angle along with vertical direction; volume ratio of the carbonaceous material to the carrier gas ranges between 10/90-90/10; the cracked products include acetylene, carbon monoxide, methane, ethylene, and char etc; the average particle diameter of the carbonaceous material is in range of 10-300 micron.

SPECIFIC MODES OF IMPLEMENTING THE INVENTION

Figure 1:
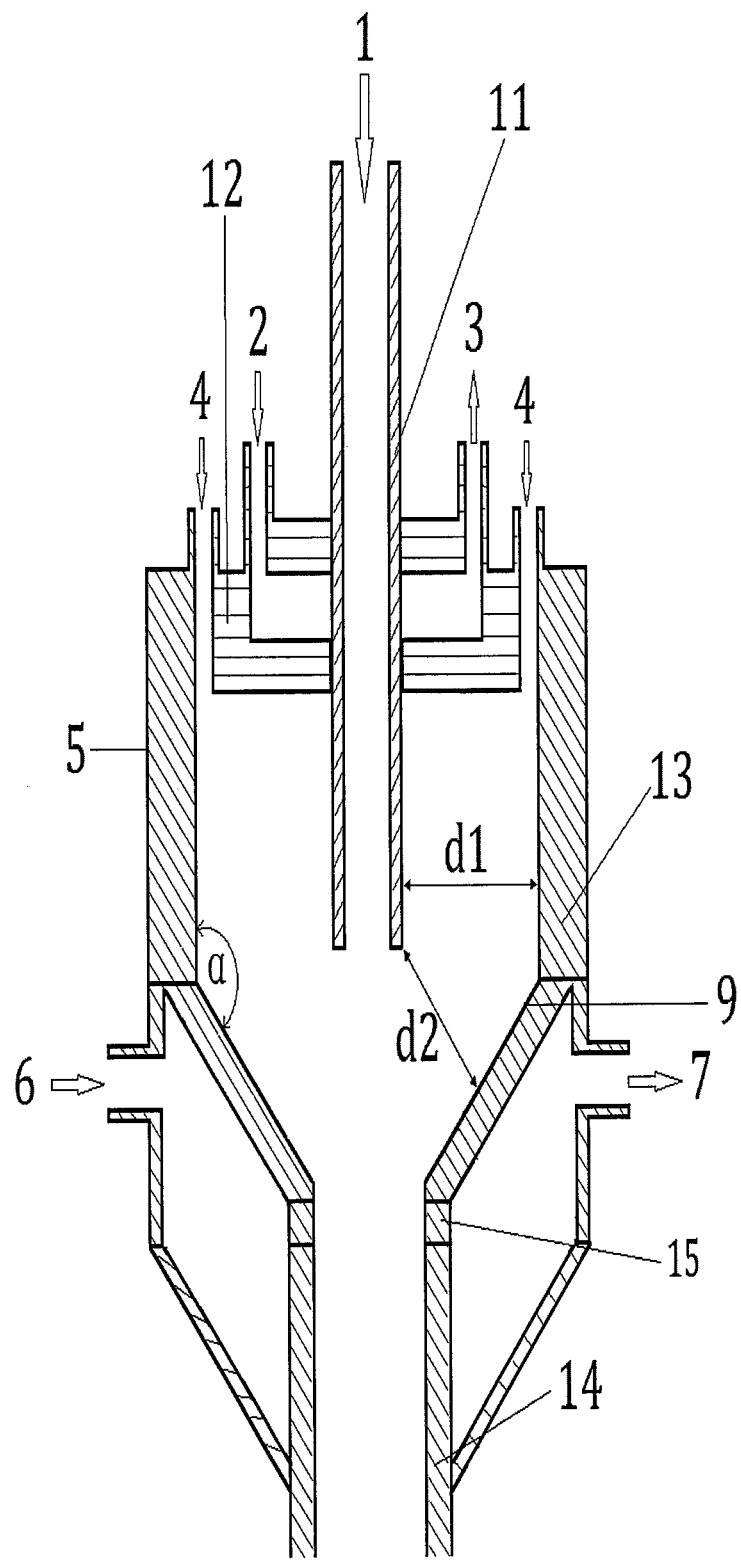
FIG. 1 is a representative schematic view of first stage of the multi-stage plasma reactor system with hollow cathodes according to the present invention, in which first reaction tube is applied as the hollow cathode of second stage of the reactor system.
Figure 2:
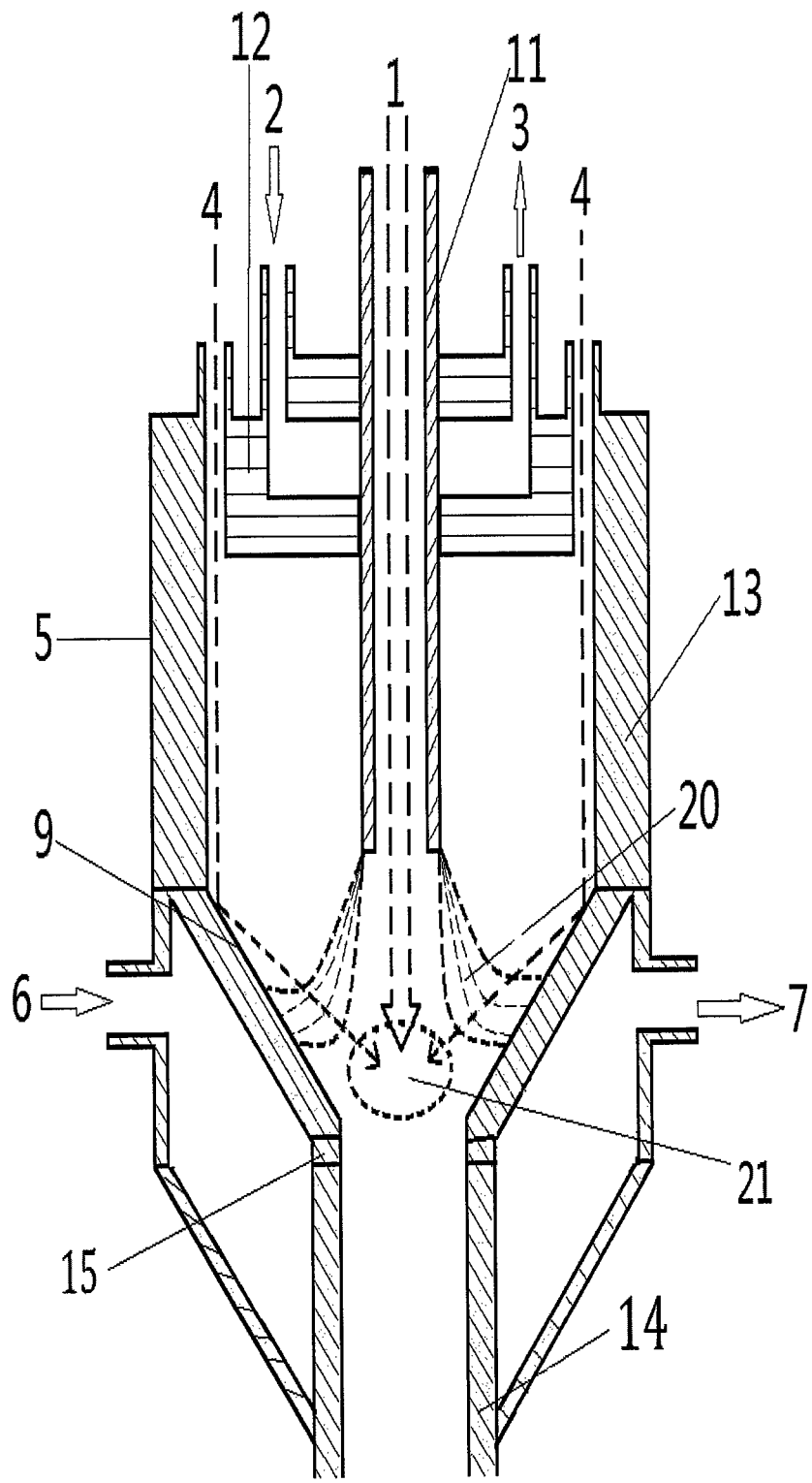
FIG. 2 is an illustrative view of the region, where the carbonaceous material contacts and mixes with plasma stream in the chamber of first stage, of the multi-stage plasma reactor system with hollow cathode as shown in FIG. 1.

The present invention will be further illustrated in detail by the following description where references are made to the appended drawings, in which, the corresponding or equivalent parts or elements as shown in the drawings are represented by the same reference number.

Generally, the reaction of the volatiles released from pyrolysis of carbonaceous material such as bituminous coal play an essential and important part in the cracked products production. Because the carbonaceous material undergoes extremely fast reaction with highly reactive gases, for example plasma high temperature gases, and such reaction is required to be terminated instantaneously, so such pyrolysis and reaction could not be described or calculated by conventional processes. Broadly speaking, the cracked products distribution depends on the types of the carbonaceous materials and operation conditions employed, if the reaction and/or residence time is only a few milliseconds it is impossible to have sufficient time to reach thermal-dynamic equilibrium, therefore soot caused by secondary reaction of volatiles derived from the carbonaceous material could not form, in measurable amount.

For the solid carbonaceous material, the thermal transfer and pyrolysis of the carbonaceous material, homogeneous solid-gas phase reactions and homogeneous gas phase reactions all contribute to the rate of cracked products formation i.e. their yield. In fact, one of the main purposes of the present invention is to maximize the yield of some specific cracked products, for example acetylene, thereby it is key point to understand and determine nature, mechanism and operation conditions of above pyrolysis and reactions for completion of the present invention.

It is attested by numerous measures and observations that pyrolysis temperature of the carbonaceous material, especially for solid carbonaceous material, is preferably in the range of 650-1250° C., for example 680-1100° C., more preferably 700-930° C., particularly preferably 750-900° C., for example 850° C. while the gas phase reaction temperature of the volatiles derived from the carbonaceous material preferably is in the range of 1500-2900° C., more preferably 1500-2500° C., particularly preferably 1500-2000° C., for example 1750° C. or 1850° C.

The above temperatures decide the preferable temperature at which the carbonaceous material releases volatiles by being subjected to pyrolysis and the preferable temperature of following gas phase reaction of the volatiles. The pyrolysis of the carbonaceous material is initiated or start in first chamber formed between first hollow cathode and first anode for generating plasma gas and/or electric arc therein and/or first reaction tube where more than 60% maximum production amount of volatiles is estimated to generally be generated while the gas phase reactions of the above volatiles mainly occur in the other the chambers and other said reaction tubes.

To obtain desired fast and completed conversion as possible, the gas phase reaction time of the said volatiles preferably is less than 4 millisecond, for example 2 millisecond, more preferably less than 1 millisecond, particularly preferably less than 0.4 millisecond, for example less 0.3 or 0.2 milliseconds. Such reaction time could guarantee to obtain high yield of the cracked products.

In general, there are several practical ways to enhance yield of cracked products, especially acetylene in following:

Firstly, the yield of some specific cracked products, for example acetylene is highly governed by the very fast reactions between primary volatiles and high reactive short-lived plasma species in the plasma high temperature gases, for instance plasma hydrogen and/or inert gases including helium. In consequence, the yield of cracked products is relatively high if the high concentration of or large amount of volatiles is released by very rapid pyrolysis of the carbonaceous material, this can be achieved by reasonable selection of very fine particle size distribution of carbonaceous material, or application of type of the carbonaceous material in low rank and simultaneously with low oxygen content in consideration of the oxygen of the volatiles could be converted into carbon monoxide at the expense of acetylene.

Secondly, optimal operation conditions the pyrolysis of the carbonaceous material are selected to obtain maximum amount of volatiles. Therefore suitable pyrolysis time, pressure and/or temperature are key points to maximize production of said volatiles.

Thirdly, the above volatiles is brought into contact with as much of the highly reactive plasma species as possible, such practice could increase surface for reaction and enhance reaction conversion.

Fourthly, the reaction temperature at which the volatiles reacts with the highly reactive plasma species is another important factor affecting the yield of cracked products, generally, yield of the cracked products increases with increase of temperature of the above gas phase reaction, but over high reaction temperature will cause formation of soot and hydrogen in measurable amount.

It is apparent from the above analysis to those skilled in the art that pyrolysis of the carbonaceous material and gas phase reaction of the primary volatiles with high reactive plasma species both are the most important processes for production of cracked products. However, optimal process parameters or operation conditions of pyrolysis usually is not the same that of the above gas phase reactions, if like as design of the structure of the plasma reactor present in the prior art, i.e. contact and mixing between the carbonaceous material and plasma stream, pyrolysis of the carbonaceous material, and gas phase reaction of primary volatiles all take places in the same space or region, not only would the thermal transfer efficiency drop due to the fact that the region where the carbonaceous material contacts and mixes with plasma stream be away from the highest temperature region, but also could process parameters or operation conditions of the pyrolysis and gas phase reactions not reach excellent balance and not be optimized.

With respect to the above fatal defect, the present inventors propose and invent a novel structure of a multi-stage plasma reactor system with hollow cathodes via numerous attempts and experiments, the invented multi-stage plasma reactor system smartly causes occurrence of the above pyrolysis and gas phase reactions in different spaces or regions so as to simultaneously reach optimized process parameters or operation conditions of the pyrolysis and gas phase reactions, and greatly enhance energy efficiency of the reactor system.

In detail, as shown in FIGS. 1-5, said multi-stage plasma reactor system with hollow cathodes, according to the present invention, with each stage comprising:

hollow cathode 11, 14 or 214 and anode 5, 205 or 305 cooled by recycling cooling medium or refrigerant, wherein an chamber is formed between the hollow cathode 11, 14 or 214 and the anode 5, 205 or 305 respectively, and at least portion of first hollow cathode 11 is positioned within inner space of first anode 5;

inlet(s) of working gas 4, 204 or 304 between outer surface of the hollow cathode 11, 14 or 214 and interior surface of the anode 5, 205 or 305 so as for the working gas 4, 204 or 304 to enter the respective chamber;

inlet(s) of carbonaceous material and carrier gas as feedstock 1 located in one end of the hollow cathode 11, 14 or 214 into the respective chamber, wherein hollow passage of the hollow cathode 11, 14 or 214 is applied to deliver the carbonaceous material and carrier gas as feedstock 1 and/or volatiles caused by pyrolysis which go through the above hollow passage into the respective chamber via the inlet(s) of carbonaceous material and carrier gas as feedstock 1;

reaction tube 14, 214 or 314 in connection with the anode 5, 205 or 305 respectively, in which first reaction tube 14 is applied to the hollow cathode of second stage of the reactor system while second reaction tube 214 is applied to the hollow cathode of third stage of the reactor system, reaction tubes 14 and 214 are connected with and physically separated from the anodes 5 and 205 by insulators 15 and 215 respectively, and the present reactor system further comprising:

at least one inlet(s) of quench medium 8 for quenching or freezing of reaction products 10 located lower portion of last one of the reaction tubes 214 or 314; and at least one outlet(s) of quenched products 10 and gases located on bottom or lower portion of last one of the reaction tubes 214 or 314; wherein plasma gas and/or electric arc is generated in the respective chamber formed between first hollow cathode 11 and the hollow cathodes 14 and 214 of second and third stages, used as the reaction tube of next up stage and the hollow anodes 5, 205 and 305 respectively, the working gas 4, 204 and 304 goes through electric arc forming regions 20 between the hollow cathodes 11, 14 and 214 and the anodes 5, 205 and 305 so as to generate plasma gas which then fully contacts and efficiently mixes with the carbonaceous material and carrier gas as feedstock 1 and volatiles caused by pyrolysis entering the respective chamber by going through the hollow passage of the hollow cathodes 11, 14 and 214 within or nearby highest temperature regions 21 of the respective chamber, and pyrolysis of the carbonaceous material and gas-phase reaction of the above volatiles occur.

As shown in FIGS. 6-10, another multi-stage plasma reactor system with hollow cathodes, according to the present invention, with each stage comprising:

hollow cathode 11, 205 or 214 and anode 5, 14 or 305 cooled by recycling cooling medium or refrigerant, wherein an chamber is formed between the hollow cathode 11, 205 or 214 and the anode 5, 14 or 305 respectively, and at least portion of first hollow cathode 11 is positioned within inner space of first anode 5;

inlet(s) of working gas 4, 204 or 304 between outer surface of the hollow cathode 11, hollow anode 14 or hollow cathode 214 and interior surface of the anode 5, hollow cathode 205 or anode 305 so as for the working gas 4, 204 or 304 to enter the respective chamber;

inlet(s) of carbonaceous material and carrier gas as feedstock 1 located in one end of the hollow cathode 11, hollow anode 14 or hollow cathode 214 into the respective chamber, wherein hollow passage of the hollow cathode 11, hollow anode 14 or hollow cathode 214 is applied to deliver the carbonaceous material and carrier gas as feedstock 1 and/or volatiles caused by pyrolysis which go through the above hollow passage into the respective chamber via the inlet(s) of carbonaceous material and carrier gas as feedstock 1;

reaction tube 14, 214 or 314 in connection with the anode 5, cathode 205 or anode 305 respectively, in which first reaction tube 14 is applied to the hollow anode of second stage of the reactor system while second reaction tube 214 is applied to the hollow cathode of third stage of the reactor system, reaction tubes 14 and 214 are directly connected with the anodes 5 and cathode 205 respectively, and the present reactor system further comprising:

at least one inlet(s) of quench medium 8 for quenching or freezing of reaction products 10 located lower portion of last one of the reaction tubes 214 or 314; and at least one outlet(s) of quenched products 10 and gases located on bottom or lower portion of last one of the reaction tubes 214 or 314;

wherein plasma gas and/or electric arc is generated in the respective chamber formed between first hollow cathode 11 and the hollow cathode 214 of third stages, used as the reaction tube of second stage and the hollow anodes 5 and 305 respectively, the working gas 4 and 304 goes through electric arc forming regions 20 between the hollow cathodes 11 and 214 and the anodes 5 and 305 so as to generate plasma gas which then fully contacts and efficiently mixes with the carbonaceous material and carrier gas as feedstock 1 and volatiles caused by pyrolysis entering the respective chamber by going through the hollow passage of the hollow cathodes 11 and 214 within or nearby highest temperature regions 21 of the respective chamber, and pyrolysis of the carbonaceous material and gas-phase reaction of the above volatiles occur.

It should be understood to those skilled in the prior art that plasma gas and/or electric arc is not generated within the chamber formed between the hollow anode 14 and cathode 205 of second stage of the reactor system according to the principle of pointed end electron discharge, however working gas 204 or hot gas preheating the carbonaceous material still fully contacts and efficiently mixes with the carbonaceous material and carrier gas as feedstock 1 and/or volatiles caused by pyrolysis entering the above chamber by going through the hollow passage of the hollow anode 14 within the above chamber, and the times of pyrolysis of the carbonaceous material and gas-phase reaction of the above volatiles are prolonged.

The structure design of the above multi-stage plasma reactor system with hollow cathodes causes that the formed plasma stream could fully contacts and efficiently mixes with the carbonaceous material and carrier gas as feedstock within the respective chamber formed between the hollow cathodes and anodes, especially within or nearby the highest temperature regions adjacent to electric arc columns in the above respective chambers so as to initiate pyrolysis of the carbonaceous material by realization of fast and efficient thermal transfer and further to release volatiles, with continuation of thermal transfer and entry of mixture into the downstream chambers and the downstream reaction tubes beneath first chamber and first reaction tube, the temperatures of the carbonaceous material and formed volatiles are further raised so as to initiate the gas-phase reaction of the above volatiles so that the various cracked products are generated, in this way, it is possible that the process parameters and operation conditions of the pyrolysis and gas phase reaction are independently managed or selected respectively, and simultaneously be optimized, that could not be reached by design of the structure of prior plasma reactor in any way.

Figure 3:
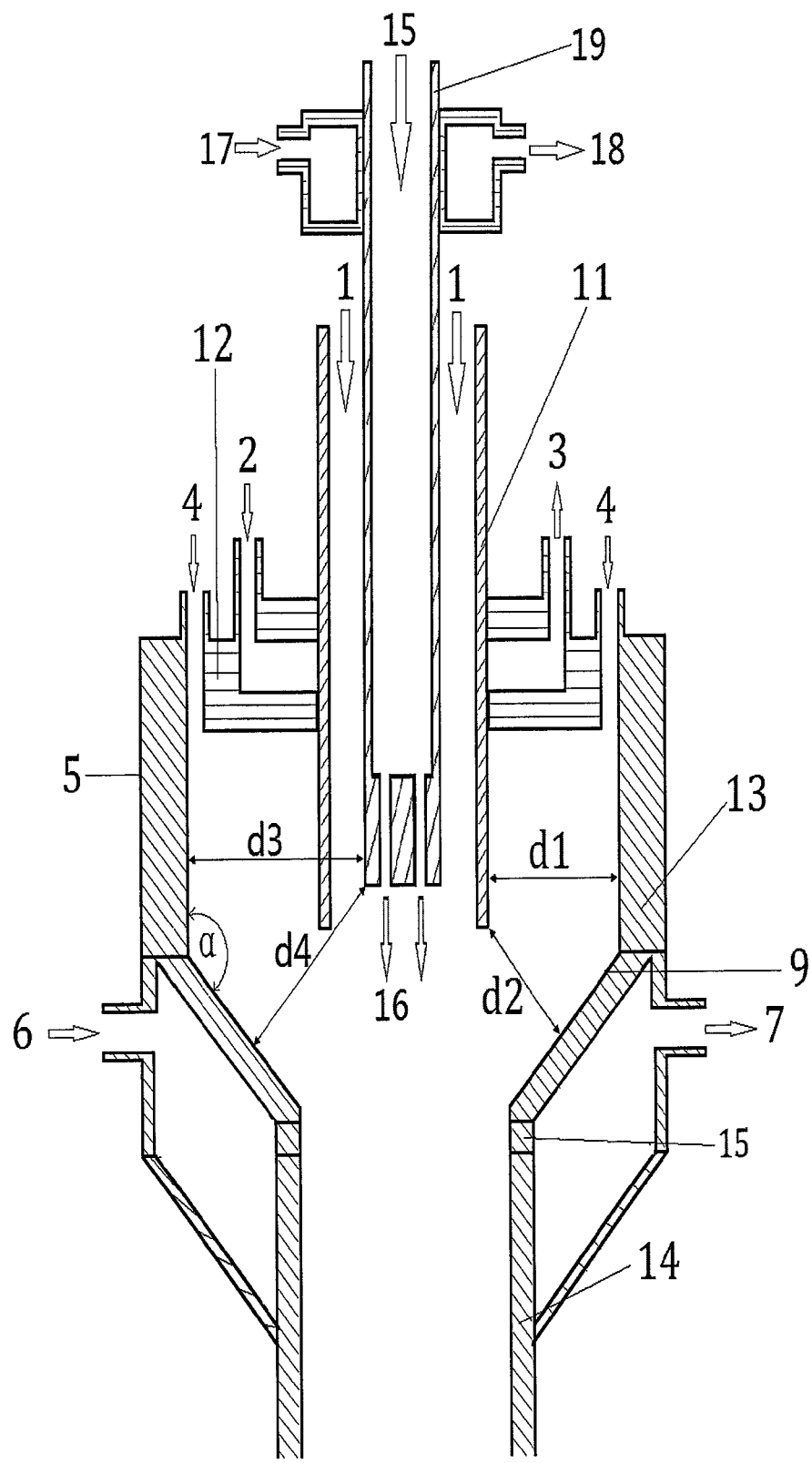
FIG. 3 is a representative schematic view of first stage of another multi-stage plasma reactor system with hollow cathodes according to the present invention, in which the hollow cathode in first stage of the reactor system is dual hollow cathodes, and reaction tube in first stage is applied as the hollow cathode of second stage of the reactor system.
Figure 8:
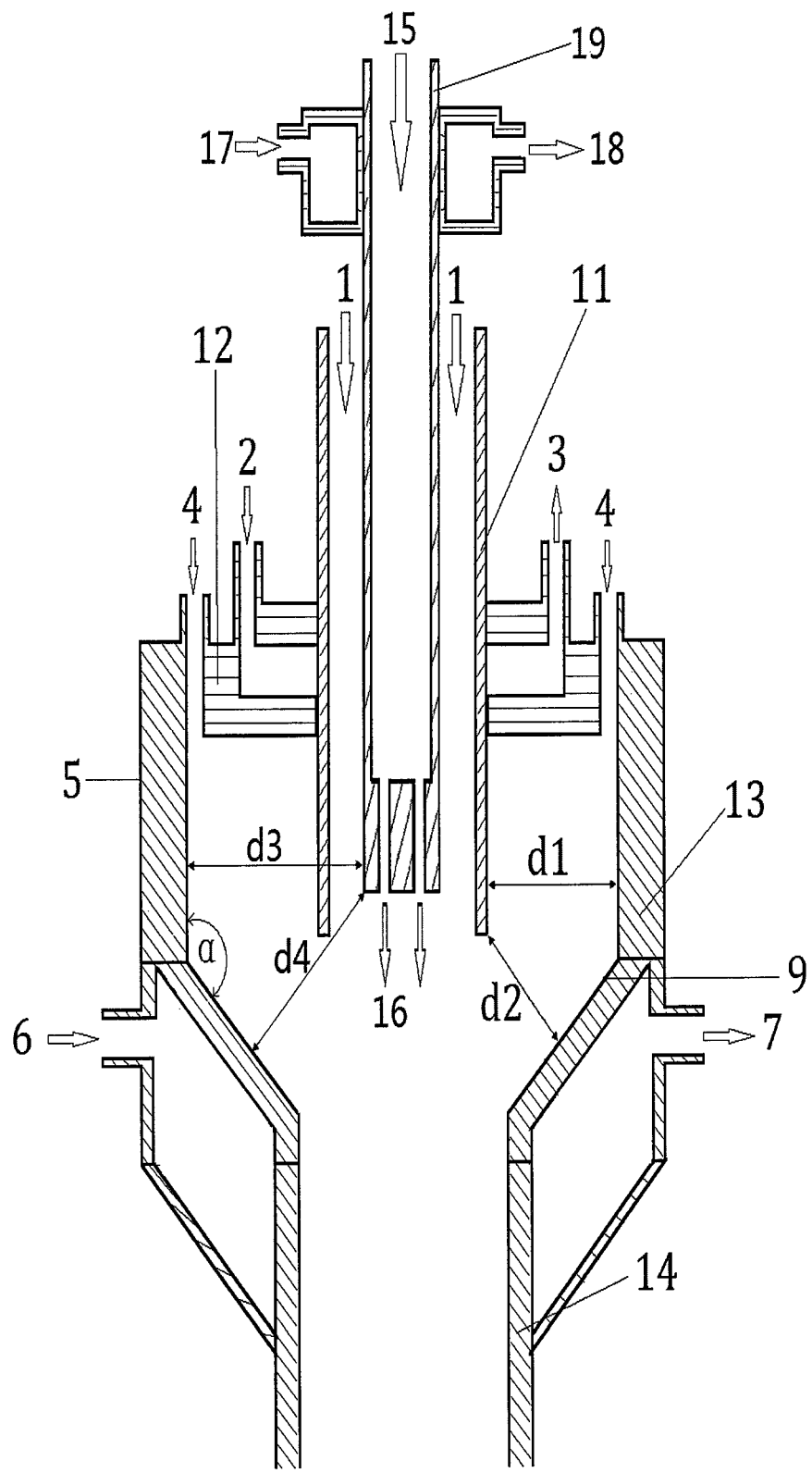
FIG. 8 is a representative schematic view of first stage of another multi-stage plasma reactor system with hollow cathodes according to the present invention, in which the hollow cathode in first stage of the reactor system is dual hollow cathodes, and reaction tube in first stage is applied as the hollow anode of second stage of the reactor system.
Figure 9:
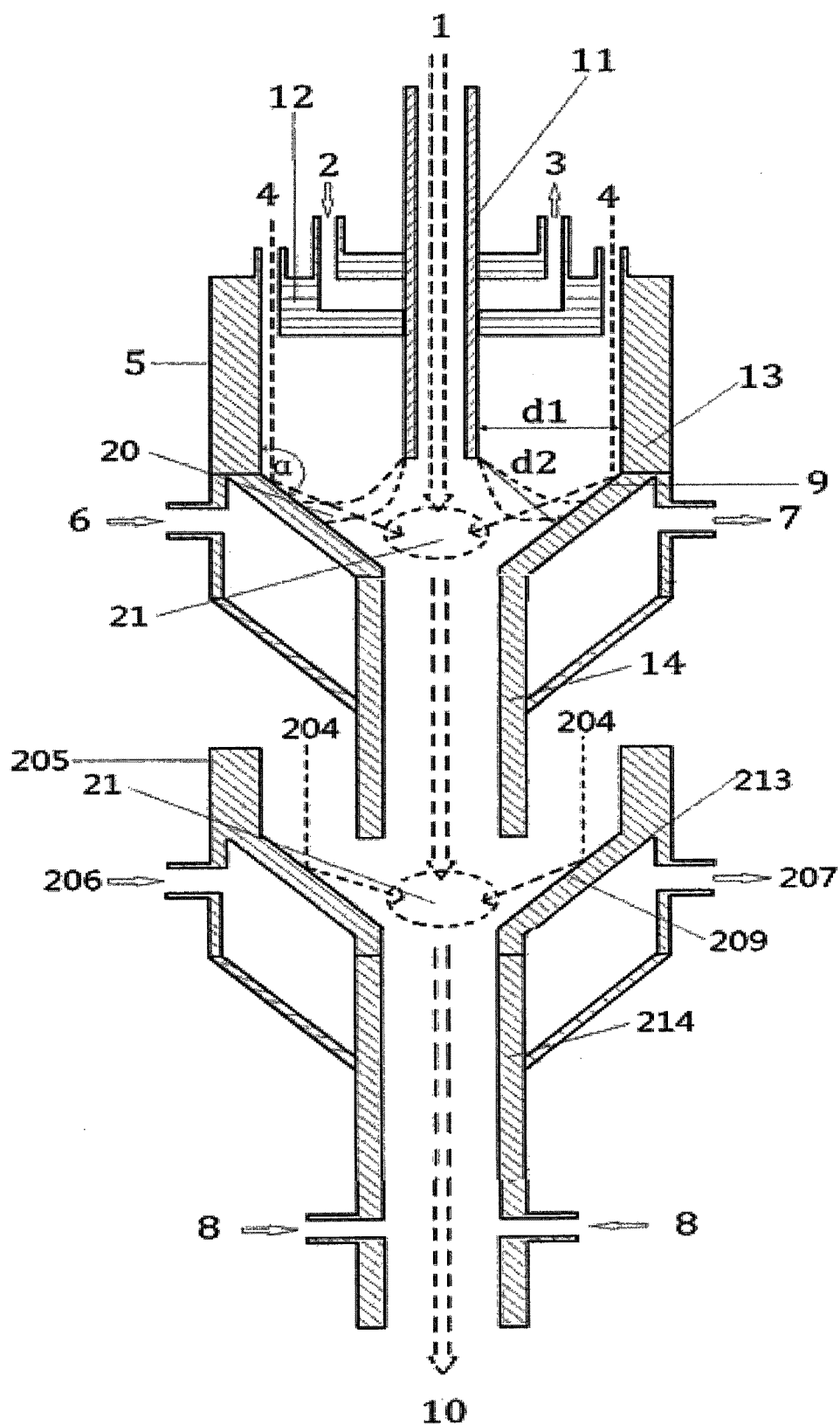
FIG. 9 is representative schematic view of the two-stage plasma reactor system with hollow cathodes according to the present invention, in which reaction tube in first stage is applied as the hollow anode of second stage of the reactor system.
Figure 10:
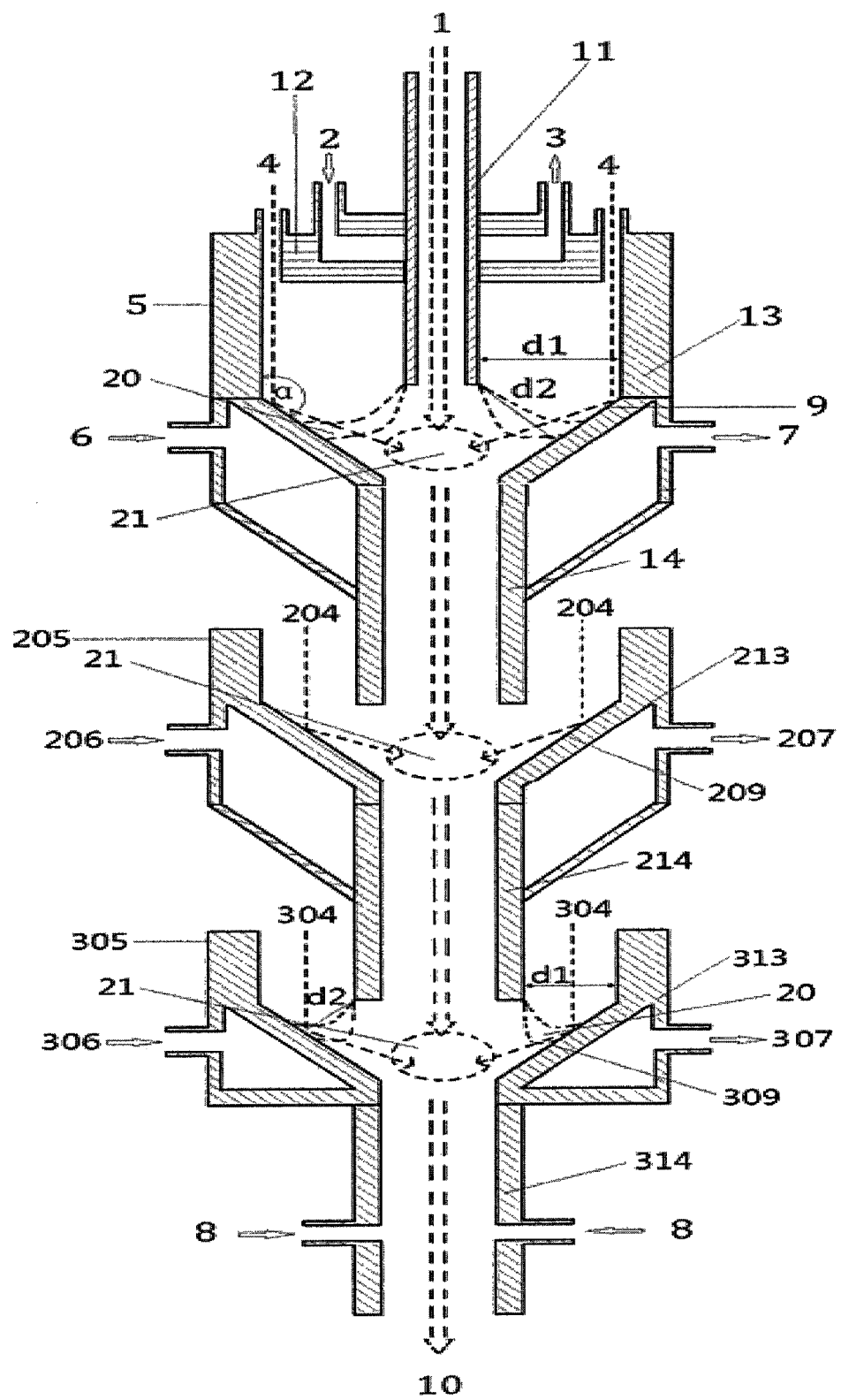
FIG. 10 is representative schematic view of the three-stage plasma reactor system with hollow cathodes according to the present invention, in which reaction tubes in first and second stages are applied as the hollow anode of second stage and the hollow cathodes three stage of the reactor system respectively.

In the another preferred embodiment of the present invention, the first hollow cathode 11 could be substituted by dual hollow cathodes, as shown in FIGS. 3 and 8, the dual hollow cathodes include both hollow cathodes 11 and 19, wherein one the hollow cathode 19 is positioned within the hollow passage of the another hollow cathode 11, the annulus gap is formed between both hollow cathodes 11 and 19, the chamber could be formed between each of the dual hollow cathodes 11 or 19 and the first anode 5 so as to generate plasma stream and/or electric arc, the carbonaceous material and carrier gas as feedstock could be inputted into the first chamber through the above annulus gap or the innermost hollow passage of the hollow cathode 19, in this case, the lower end of the above annulus gap or the innermost hollow passage of the hollow cathode 19 is applied as the inlet of the carbonaceous material and carrier gas as feedstock 1.

One benefit where the above dual hollow cathodes is applied in the present invention is that if the carbonaceous material and carrier gas as feedstock 1 is inputted in the first chamber through the above annulus gap, under the condition that the inner hollow cathode 19 or outer hollow cathode 11 is operated as working cathode, the innermost hollow passage of inner hollow cathode 19 could be not only applied as the supplementary delivery passage of the working gas 4 but also applied as the delivery passage of hot gas 15 for preheating the carbonaceous material and carrier gas as feedstock 1 so that the temperature of the carbonaceous material and carrier gas as feedstock 1 would be higher prior to its contact with the plasma stream, this fact facilitates to fast and efficient thermal transfer to the carbonaceous material. Only in the case that the inner hollow cathode 19 is operated as working cathode, would the carbonaceous material and carrier gas as feedstock 1 also pass through the electric arc column, just like as the working gas 4, so as to be preheated or heated by the electric arc column prior to contact and mixing with the formed plasma stream, in this way, the temperature or preheating rate of the carbonaceous material would become higher so as to facilitate to release more volatiles.

Another benefit where the above dual hollow cathodes is applied in the present invention is that if the carbonaceous material and carrier gas as feedstock 1 is inputted in the chamber through the innermost hollow passage of inner hollow cathode 19, under the condition that the inner hollow cathode 19 or outer hollow cathode 11 is operated as working cathode, the above annulus gap could be not only applied as the supplementary delivery passage of the working gas 4 but also applied as the delivery passage of hot gas 15 for preheating the carbonaceous material and carrier gas as feedstock 1 so that the temperature of the carbonaceous material and carrier gas as feedstock 1 would be higher prior to its contact with plasma stream, this fact also facilitates to fast and efficient thermal transfer to the carbonaceous material. Only in the case that the inner hollow cathode 19 is operated as working cathode, and the above annulus gap is applied as the supplementary delivery passage of the working gas 4, would the working gas 4 which is inputted into the first chamber through the above annulus gap also pass through the electric arc column so as to generate the high temperature plasma stream.

As shown in FIGS. 1-3 and 6-8, the locations of electric arc forming regions 20 and/or the highest temperature regions 21 could change by adjustment of locations, sizes and/or structure parameters of the hollow cathodes, dual hollow cathodes, anodes, and/or chambers, such adjustment could guarantee that the region where the carbonaceous material and carrier gas as feedstock 1 and/or volatiles caused by pyrolysis fully contacts and efficiently mixes with the in-situ formed plasma stream is located into or nearby the highest temperature regions 21 immediately adjacent to electric arc forming regions 20 in the respective chambers so as to realize fast and efficient thermal transfer to the carbonaceous material. For example, the closest horizontal distance between the outer surface of the first hollow cathode 11 or any one of the dual hollow cathodes 11 or 19 and the interior surface of the first anode 5 $d_1$ or $d_3$ ranges within 1-400 mm while the closest distance between the bottom of outer surface of the first hollow cathode 11 or any one of the dual hollow cathodes 11 or 19 and the interior surface of the first anode 5 $d_2$ or $d_4$ ranges within 1-400 mm, preferably within 1-15 mm, for instance 10 mm; angle formed between interior surface of side wall 13 of the first anode 5 and that of bottom wall 9 of the first anode 5 ranges within 90°-160°, preferably within 105°-445°, for instance 135°. The above indexes or parameters are still applicable to the hollow cathodes, anodes and chambers of other stages of the present plasma reactor system.

In order to prevent the hollow cathodes 11, 14, or 214, the dual hollow cathodes 11 or 19 and anodes 5, 205 and 305 from overheating, at least portion of outer surface of the hollow cathode 11, 14, or 214, each of the dual hollow cathodes 11 and 19, and/or the anode 5, 205 and 305 is cooled by recycling cooling medium or refrigerant with inlets 2, 17, 6, 206 and 306 and/or outlets 3, 18, 7, 207 and 307 of cooling medium or refrigerant there nearby. The dual hollow cathodes each 11 and 19 are physically separated from the first anode 5 by an insulator 12. The hot gas 15 preheating the carbonaceous material and carrier gas as feedstock 1, entering the annulus gap or innermost hollow passage of the dual hollow cathodes generally reaches temperature of 100° C.-1000° C.

it is preferred that, in order to most efficiently realize the fast thermal transfer to the carbonaceous material and full contact and mixing between various material flows, a material flow distributor 16 could be optionally connected with the lower end of the hollow cathodes 11, 14, 214, annulus gap between both of dual hollow cathodes 11 and 19 or the innermost hollow passage of the hollow cathode 19, and/or the hollow anode 14 so as to adjust flowing rate or direction of the carbonaceous material and carrier gas as feedstock 1, the volatiles caused by pyrolysis, working gas 4 and/or hot gas 15.

In the above plasma reactor system, the pyrolysis temperature of the carbonaceous material which generally is 650° C.-1250° C. is much less than temperature of gas phase reaction which generally is 1500° C.-2900° C., therefore the hot gas 15 which facilitates to or promotes pyrolysis could be $H_2$, $N_2$, methane, inert gas, and/or plasma gases of $H_2$, $N_2$, methane, and/or inert gases while the working gases 4, 204, and/or 304 become into high temperature plasma gases of hydrogen, nitrogen, methane, and/or inert gas after passing through the electric arc forming region 20.

In order to prevent cracked products obtained in the gas phase reaction, for example acetylene from decomposing or occurrence of second reaction for finally forming low valuable soot and hydrogen, the generated cracked products must be quenched instantaneously before exiting last one said reaction tubes 214 or 314. Generally, the cracked products preferably are quenched within 4 milliseconds, for example 2 milliseconds after their formulation to below temperature of 650° C., preferably below 600° C., particularly preferably below 527° C. Said quench media could preferably include water, steam, propane, aromatics, inert gas, any types of carbonaceous material and/or mixture thereof.

The pressure of said reactor system could be in range of from negative pressure to positive pressure, for example 70-200 KPa, preferably 100-150 KPa, more preferably 110-140 KPa. The lengths of reaction tubes 14, 214 or 314 and feedstock flow rate typically depend on the residence time of feedstock in the respective chambers and the reaction tube 14, 214 or 314 and reactions time thereof. More typically, the total time for the pyrolysis, gas phase reaction and quench occurring in said reactor system is preferably less than 50 milliseconds.

To obtain excellent transportation efficiency of the carbonaceous material in the very fine particles or well dispersion form and/or realize well mixing or intimate contact of the carbonaceous material with plasma stream, carrier gas for transposition of said carbonaceous material is generally required, and could be selected from group consisting of hydrogen, methane, nitrogen, gaseous carbonaceous material, inert gas and/or mixture thereof. The exemplary examples of inert gases are for example argon and/or helium.

The cross section of said anode 5, 205, and/or 305 and reaction tube 14, 214, and/or 314 could be in any shape, for example round, square, elliptic, polygonal or any regular shape else. But to prevent wall inner surface of the reaction tube 14, 214, and/or 314 from apparently coking, cross section area of lower end of reaction tube 14, 214, and/or 314 preferably is 1-3 times of that of the upper end of reaction tube 14, 214, and/or 314. Such design prevents feedstock or cracked products from direct flushing the above inner surface and forming or accumulating coking thereon.

In the same way, to uniformly distribute or disperse feedstock 1, working gases 4, 204, and/or 304, hot gas 15, cracked products 10 and/or quench medium 8 in the inner space of said reactor system, it is preferred that amount of the inlets of the carbonaceous material and carrier gas as feedstock at every stage is 1-32; amount of the inlets of the working gas at every stage is 2-32 while amount of the inlets of quench medium is 2-64; amount of the inlets of the hot preheating gas is 1-32, furthermore above said various inlets more preferably are symmetrically and oppositely arranged in the horizontal direction.

The carbonaceous material useful in the plasma reactor system according to present invention could be solid, liquid and/or gaseous material, but preferably solid carbonaceous material, for example is selected from group consisting of coal, coal tar, coal direct liquefaction residue, heavy crude residuum, char, petroleum coke, tar sand, shale oil, carbonaceous industrial wastes or tailings, biomass, synthetic plastic, synthetic polymer, spent tire, municipal solid waste, bitumen, and/or mixture thereof.

In the plasma reactor system according to the present invention, the power input of the hollow cathodes 11, 14, and/or 214, each of dual hollow cathodes 11 or 19, and/or anodes 5, 205, and/or 305 generally ranges within 10 kW-20 MW so as to form electric arc generating plasma stream. Detailed information about the plasma generator could be took from or are referred to the aforesaid reference documents, for example U.S. Pat. No. 4,358,629, CN1562922A or CN 101742808A, the detailed description regarding it is herein omitted for economic presentation.

The time of pyrolysis of the carbonaceous material which starts in the first chamber formed between the first hollow cathode 11 or 19 and the first anode 5 and continues after entering the first reaction tube 14, usually is more than that of gas phase reaction of primary volatiles with highly reactive but very short-lived plasma species contained in the high temperature plasma gases, which mainly occurs in the other chambers and the other reaction tube 214 and/or 314.

In order to uniformly distribute the working gases 4, 204, and/or 304 or quench medium 8 in the respective chambers or the reaction tube 14, 214, and/or 314, it is preferred that the inlets of the working gases 4, 204, and/or 304 and/or the inlets of quench medium 8 are centrally symmetrically arranged in horizontal direction, particularly, angle formed by the inlets of the quench medium 8 could be in range of from −45° to +45° in horizontal direction, and both opposite or non-direct opposite the inlets of the quench medium 8, on the same horizontal level, form an angle along with vertical direction, so as to obtain optimal quench efficiency of cracked products 10, especially fresh acetylene so as to maximize their yield.

The above novel structure design of the plasma reactor system according to the present invention has following advantages and characteristics:

Firstly, because the regions where the carbonaceous material and carrier gas as feedstock 1 contacts and mixes with the plasma stream are located within or nearby the highest temperature regions 21 immediately adjacent to the electric arc forming regions 20 in the respective chambers, the temperature and heating rate of the carbonaceous material is greatly enhanced, with realization of fast and efficient thermal transfer to the carbonaceous material, the carbonaceous material would release more volatiles that could cause production of more cracked products.

Secondly, pyrolysis of the carbonaceous material starts in the first chamber and continues after entering the first reaction tube, therefore the time and location when or where the carbonaceous material contacts and mixed with the high temperature plasma stream, as well as is pyrolyzed are different from that of gas phase reaction of the primary volatiles which mainly occurs in the other chambers and the other reaction tubes of the present multi-stage plasma reactor system, this fact would causes that the pyrolysis and gas-phase reaction occur in different spaces or regions so as to possibly independently mange and select the process parameters and operational conditions of the pyrolysis and gas-phase reaction respectively, and possibly make them simultaneously reach optimized values, as a result, the rate of conversion from the carbonaceous material to the cracked products remarkably increase.

Thirdly, due to realization of fast and efficient thermal transfer to the carbonaceous material and carrier gas as feedstock from the plasma stream, and the regions where the carbonaceous material contacts and mixed with the high temperature plasma stream are located into the above chambers, instead of into reaction tubes, this fact prevents serious energy waste, and coking and over-high temperature distribution onto or nearby wall inner surface of reaction tubes, as a result, over concentration of thermal emission would not occur in the reaction tube.

The multi-stage plasma reactor system with hollow cathodes according to the present invention could be applied to produce cracked products derived from variety of carbonaceous material; typical process is described in following:

a) introducing the carbonaceous material by aid of the carrier gas and/or volatiles caused by pyrolysis via said hollow passage of the hollow cathodes or anodes of every stage into the chamber formed between the hollow cathode and anode of every stage, in which plasma streams and/or electric arcs are generated in at least most of the above respective chambers;

b) introducing the working gas jet into said respective chamber via the inlet(s) of the working gas located between outer surface of the hollow cathode or anode of every stage and inner surface of the anode or cathode of every stage, the working gases then become into plasma gases when passing through the electric arc forming regions between the hollow cathodes and anodes in at least most of the above respective chambers, and then fully contact and efficiently mix with the carbonaceous material and/or the volatiles caused by pyrolysis which enter the above respective chambers through the hollow passage or annulus gap of the hollow cathodes within or nearby the highest temperature regions in the respective chambers, and pyrolysis of the carbonaceous material and gas phase reaction of the volatiles occurs;

c) Introducing then mixture of the carbonaceous material and carrier gas as feedstock and/or volatiles caused by pyrolysis and the plasma stream into the reaction tube of every stage, wherein, with continuation of thermal transfer to the carbonaceous material, the gas phase reactions of volatiles resulted from pyrolysis occur in the chambers and reaction tubes except the first chamber and first reaction tube, and optionally, the carbonaceous material continues to be pyrolyzed in the chambers and reaction tubes except the first chamber and first reaction tube by further thermal effect of the high temperature plasma gas jets, so as to produce cracked and/or pyrolyzed products;

d) introducing the quench medium into last one of said reaction tubes via said quench medium inlets so as to quench or freeze said cracked and/or pyrolyzed products;

e) withdrawing the cracked and/or pyrolyzed products, gases, and/or residuum of pyrolyzed carbonaceous material out of last one of said reaction tubes via said outlets of quenched products and gases.

In general, the cracked products derived from the carbonaceous material is a mixture including acetylene, carbon monoxide, methane, ethylene, hydrogen, and char etc. if some specific cracked products, for example acetylene are intended to be obtained, such cracked products mixture is required to be separated so as to get essentially pure cracked product. For example, the aforesaid reference documents—U.S. Pat. No. 4,367,363 disclosed such separation method in which the pure acetylene was separated from the above cracked products mixture. The detailed description about it is omitted herein for economic presentation.

In order to obtain optimal efficiency of pyrolysis and cracking of the carbonaceous material, in addition to the structure design of the plasma reactor system, the physical and chemical properties of feedstock should be further considered or selected so as to maximize the cracked products yield. In general, average particle diameter of the carbonaceous material preferably is in range of 10-300 micron while temperature of the carbonaceous material before entering said reactor system preferably is in range of 20-300° C. The volume ratio of the carbonaceous material to carrier gas generally ranges from 10/90-90/10, preferably 20/80-80/20, more preferably 30/70-70/30, particularly preferably 40/60-60/40, for example 50/50.

Finally, it should be understood that the heating rate of the carbonaceous material into the respective chambers preferably is more than $10^4$ K/Second; and the locations, sizes and/or structure parameters of the hollow cathodes, dual hollow cathodes, anodes, and/or chambers could be adjusted for operation flexibility and various operation requirements in different circumstances.

EXAMPLE

Example 1

Figure 4:
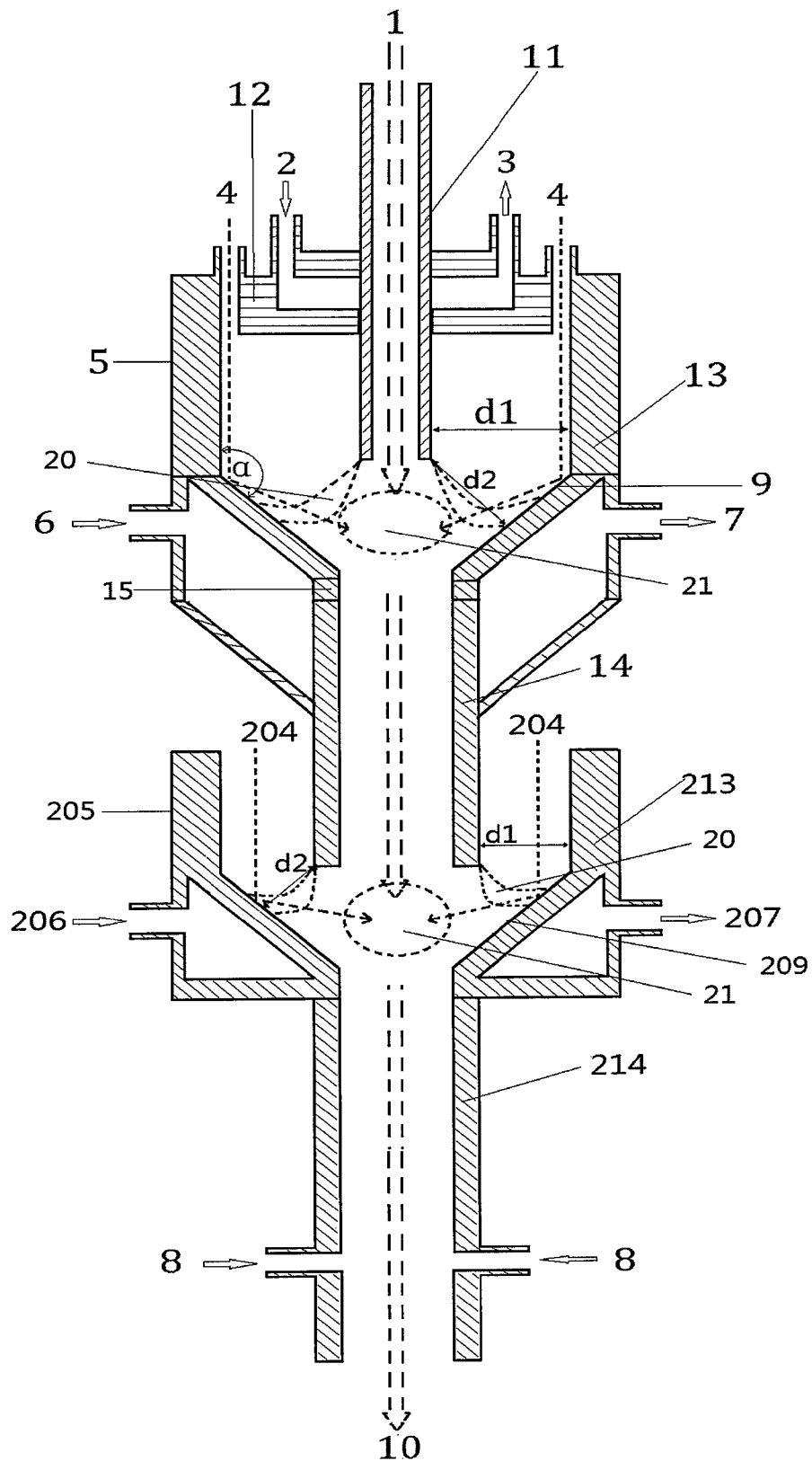
FIG. 4 is representative schematic view of the two-stage plasma reactor system with hollow cathodes according to the present invention, in which reaction tube in first stage is applied as the hollow cathode of second stage of the reactor system.

A plasma reactor system for cracking coal, which of schematic view was shown in FIG. 4, was used to convert coal into acetylene and other chemicals. The powder input of the hollow cathode and/or anode in the present plasma reactor system was 10 kW so as to form the electric arc generating plasma stream. As shown in FIG. 4, the reactor system mainly consisted of the hollow cathodes 11 and 14, anodes 5 and 205, inlets of the working gases 4 and 204, first reaction tube 14 applied as second hollow cathode and second reaction tube 214, inlets of quench medium 8 and inlet of quenched products 10, in which the closest horizontal distances between the outer surfaces of the hollow cathodes 11 and 14 and the interior surfaces of the anodes 5 and 205 $d_1$ were 12 mm respectively while the closest distances between the bottoms of outer surface of the hollow cathodes 11 and 14 and the interior surfaces of the anodes 5 and 205 $d_2$ were 10 mm respectively; angles formed between interior surfaces of side wall 13 and 213 of the anodes 5 and 205 and that of bottom wall 9 and 209 of the anodes 5 and 205 were 135° respectively; the inner diameter, wall thickness of the first hollow cathode 11 was 8 mm and 1 mm respectively; the inner diameters, wall thicknesses and lengths of the reaction tubes 14 and 214 were 14 mm, 2 mm and 30 mm respectively. The walls of the reaction tubes 14 and 214 were constructed of copper on or near their tops and steel at other regions while the walls of the reaction tubes 14 and 214 were cooled by water cycling at high velocity in the annulus gaps between the walls and their external jackets. The reaction tube 14 was physically separated from the anode 5 by insulator 15.

The high volatile bituminous coal was grinded into coal powder fine particles with a particle size distribution (PSD) of 72% by weight <106 micrometer and 100% by weight <150 micrometer. As a feedstock, the coal powder at 300K was injected into the first and second chambers through the hollow passages of the hollow cathodes 11 and 214 along with the gaseous mixture of argon and hydrogen with volume ratio of 2:8 as a carrier gas, in the same way, the working gases of the gaseous mixture of argon and hydrogen with volume ratio of 2:8 were also introduced into the above both chambers through their inlets, and then became the plasma stream, the carbonaceous material and/or volatiles caused by pyrolysis and the working gas which has been converted into plasma gas were rapid mixed at region immediately adjacent to electric arc column in the above both chambers.

The coal powder contained about 40% by weight of volatiles by proximate analysis, accounted by dry and ash free base while by the ultimate analyses, the coal powder had elemental composition, accounted by dry bases (dried for 2 hours at 110° C.), as shown in below table 1:

TABLE 1

| C w % | H w % | O w % | N w % | S w % | $H_2O$ w % | Ash w % |
|---|---|---|---|---|---|---|
| 79.2 | 5.5 | 6.3 | 1.6 | 1.1 | 2.3 | 4.0 |

The reactor system ran at the following operation conditions: system pressure of 115 kPa, output power of the electrode of 10 kW, coal flow rate of 600 g/h, flow rate of the gaseous mixture of argon and hydrogen of 84 g/h in which the flow rate of the working gas was 80 g/h while that of carrier gas was 4 g/h. The temperatures of the gaseous mixture of argon and hydrogen as working gas, which is divided into two equal parts, after being converted into plasma stream at regions immediately adjacent to the electric arc columns were about 3000 K so as for heat conversion factor to reach about 84%, and the high temperature plasma gas jets were then injected into the both reaction tubes after rapid and efficiently mixing with the coal power and carrier gas as feedstock and/or volatiles caused by pyrolysis. Water was injected into inside of the reaction tube 214 through two quench medium inlets near the outlet of cracked products to instantaneously quench or freeze the formed products stream. The total residence time of coal powder in the reaction tube was approximately 30 milliseconds.

The reactor system had about 80% energy efficiency, i.e., 80% of the power input was intaken by the products stream and the water cooling wall of the plasma reactor system in which the heat loss caused by the reaction tube was about 0.8 kW.

The reactor system output products stream, formed under the above operation conditions, had the acetylene yield and energy consumption, as shown in below table 2:

TABLE 2

| Acetylene/100 kg coal | SER |
|---|---|
| 21.1 kg | 9.3 kWh/kg-$C_2H_2$ |

In the above table 2, SER is referred to the gross Specific Energy Requirement based on the power delivered at the electrodes.

Comparative Example 1

The experiment described in the example 1 was repeated except that the two-stage plasma reactor system according to the present invention was substituted by prior plasma reactor system, in which the coal powder and carrier gas as feedstock was injected into the reaction tube at the top while the same amount of high temperature plasma stream was poured into the reaction tube at side surface nearby top, the structure and size of the reaction tube was the same as that of combination of the reaction tubes 14 and 214 used in the example 1.

The performances of the two different types of reactor system were listed in below table 3. It is apparent from the table 3 by comparison that performances of the two-stage plasma reactor system according to the present invention were much better than that of prior plasma reactor system.

TABLE 3

| Example<br>The type of reactor | Comparative<br>example 1<br>prior<br>reactor system | Example 1<br>present<br>reactor system |
|---|---|---|
| Acetylene yield, g/100 g coal | 14.8 | 21.1 |
| SER, kWh/kg-$C_2H_2$ | 12.3 | 9.3 |
| Mass Fraction of $C_2H_2$ in Products Stream, wt % | 27.2 | 33.9 |
| Coal Conversion, % | 46.8 | 46.0 |
| Heat Flow Rate Loss from Reactor Wall, kW | 1.23 | 0.8 |
| Energy Efficiency % | 72.47 | 80.1 |

In the above table 3, the meaning of SER was the same as that in the table 2; Energy Efficiency was referred to relative amount of heat intake by products steam and cooling water compared to power input.

Example 2

Figure 5:
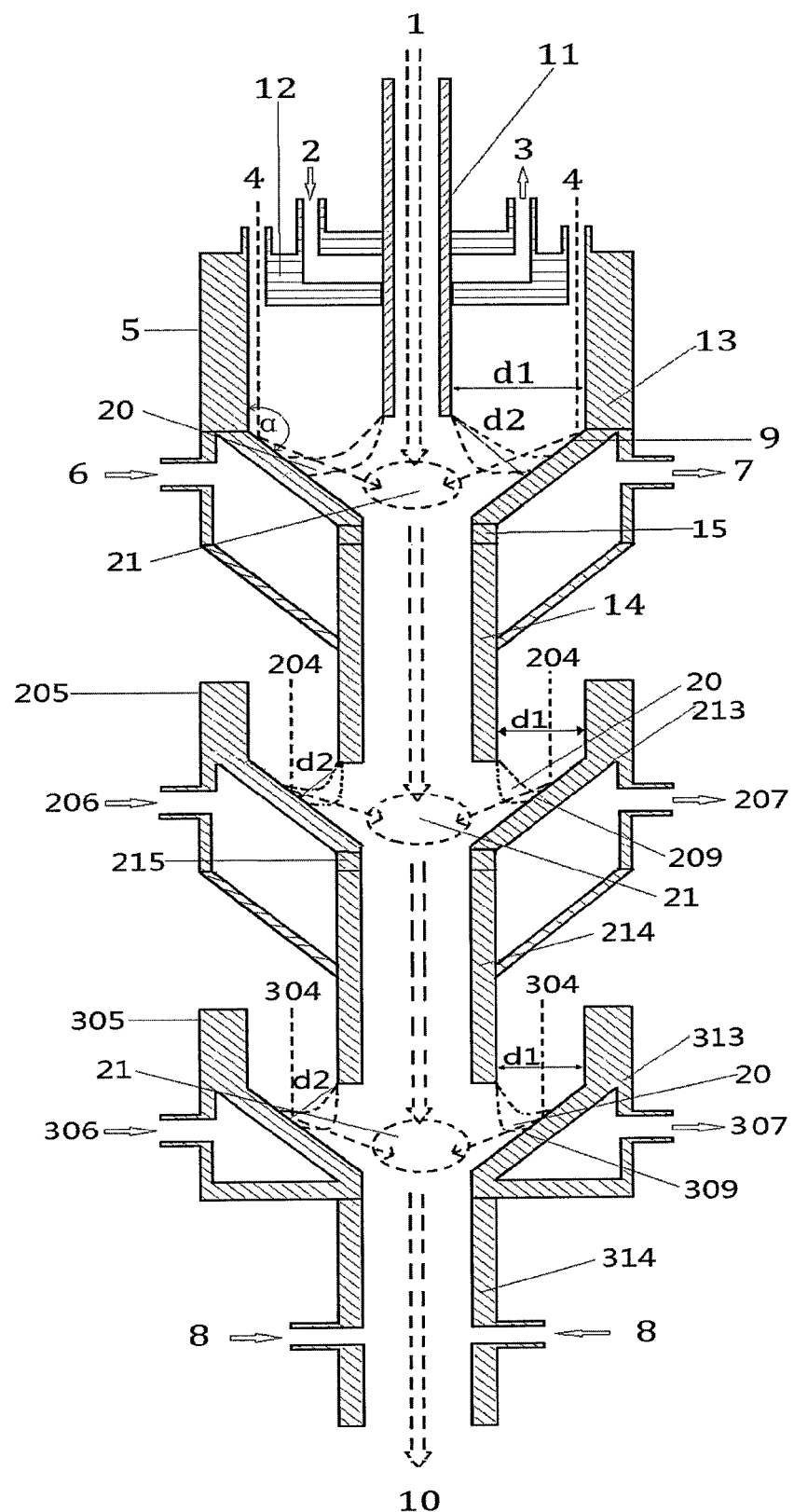
FIG. 5 is representative schematic view of the three-stage plasma reactor system with hollow cathodes according to the present invention, in which reaction tubes in first and second stages are applied as the hollow cathodes of second and three stages of the reactor system respectively.
Figure 6:
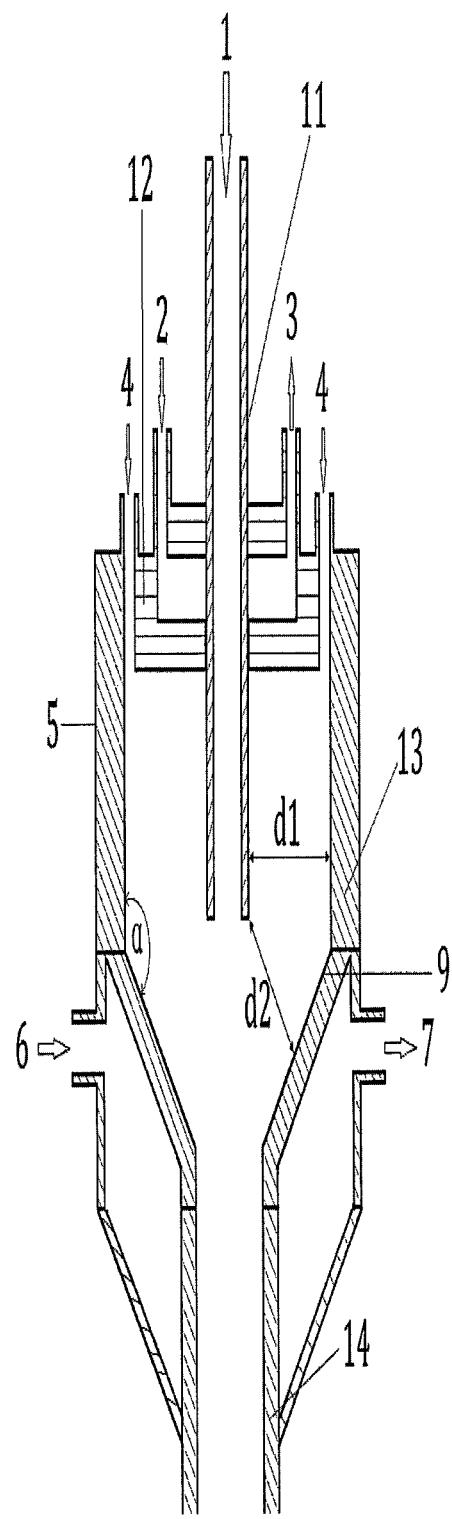
FIG. 6 is a representative schematic view of first stage of the multi-stage plasma reactor system with hollow cathodes according to the present invention, in which first reaction tube is applied as the hollow anode of second stage of the reactor system.
Figure 7:
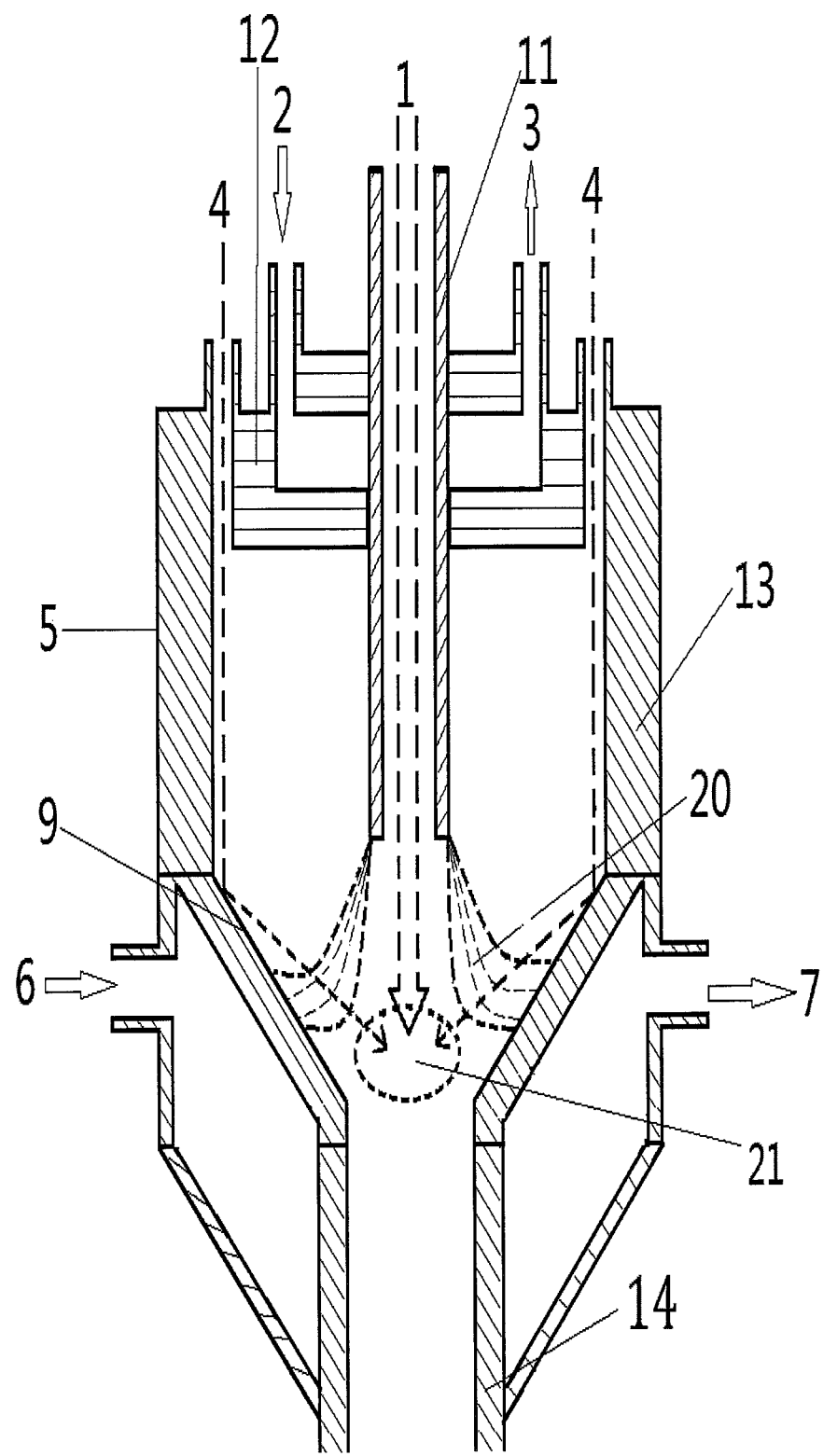
FIG. 7 is an illustrative view of the region, where the carbonaceous material contacts and mixes with plasma stream in the chamber of first stage, of the multi-stage plasma reactor system with hollow cathode as shown in FIG. 6.

The experiment described in the example 1 was repeated except that the plasma reactor system as shown in FIG. 4 was substituted by the plasma reactor system as shown in FIG. 4, in which the power input of first hollow cathode and/or first anode in the present plasma reactor system was 10 kW while the power inputs of second and third hollow cathodes and/or anodes in the present plasma reactor system were 15 kW so as to form the electric arc generating plasma stream. As shown in FIG. 5, the reactor system mainly consisted of the hollow cathodes 11, 14 and 214, anodes 5, 205 and 305, inlets of the working gases 4, 204 and 304, first reaction tube 14 used as second hollow cathode, second reaction tube 214 used as third hollow cathode and third reaction tube 314, inlets of quench medium 8 and inlet of quenched products 10, in which the closest horizontal distances between the outer surfaces of the hollow cathodes 11, 14 and 214 and the interior surfaces of the anodes 5, 205 and 305 $d_1$ were 12 mm respectively while the closest distances between the bottoms of outer surfaces of the hollow cathodes 11, 14 and 214 and the interior surfaces of the anodes 5, 205 and 305 $d_2$ were 8 mm respectively; angles formed between interior surfaces of side walls 13, 213 and 313 of the anodes 5, 205 and 305 and that of bottom walls 9, 209 and 309 of the anodes 5, 205 and 305 were 135°; the inner diameter, wall thickness of the first hollow cathode 11 was 8 mm and 1 mm respectively while the inner diameters, wall thicknesses and lengths of the reaction tubes 14, 214 and 314 were 14 mm, 2 mm and 30 mm respectively. The walls of the reaction tubes 14, 214 and 314 were constructed of copper on or near their tops and steel at other regions while the walls of the reaction tubes 14, 214 and 314 were cooled by water cycling at high velocity in the annulus gaps between the walls and their external jackets. The reaction tubes 14 and 214 were physically separated from the anodes 5 and 205 by insulator 15 and 215 respectively.

Coal powder used in the present example 3 was the same as that used in the example 1, and was grinded into fine powder with a particle size distribution (PSD) of 80% by weight <100 micrometer and 100 by weight <120 micrometer.

The reactor system ran at the following operation conditions: system pressure of 125 kPa, the output power of the first hollow cathode 11 and/or anode 5 of 10 kW while the output powers of the second and third hollow cathodes 14 and 214 and/or anodes 205 and 305 of 15 kW, coal flow rate of 800 g/h, and flow rate of the gaseous mixture of argon and hydrogen with volume ratio of 2:8 of 105 g/h in which the flow rate of the working gases 4, 204 and 304 which were divided into three parts was 100 g/h while that of carrier gas was 5 g/h. The temperatures of the gaseous mixture of argon and hydrogen as working gases 4, 204 and 304 after being converted into plasma streams at regions immediately adjacent to the electric arc columns were about 3300 K so as for heat conversion factor to reach about 86%, the coal powder and carrier gas as feedstock and/or volatiles caused by pyrolysis were injected into the three chambers through the hollow passages of the three hollow cathodes 11, 14 and 214, and the high temperature plasma gas jets were then injected into the three reaction tubes 14, 214 and 314 after rapid and efficiently mixing with the coal power and carrier gas as feedstock and/or volatiles caused by pyrolysis. Water was injected into inside of last one of the reaction tubes 314 through two quench media inlets near the outlet of cracked products to instantaneously quench or freeze the formed products stream. The total residence time of coal powder in the reactor system was approximately 35 milliseconds. The reactor system had about 82% energy efficiency, i.e., 82% of the power input was intaken by the products stream and water cooling wall of the plasma reactor system in which the heat loss cause by the reaction tube was about 1.0 kW.

The reactor system output products stream, formed under the above operation conditions, had the acetylene yield and energy consumption, as shown in below table 4:

TABLE 4

| Acetylene/100 kg coal | SER |
|---|---|
| 22.9 kg | 9.0 kWh/kg-$C_2H_2$ |

In the above table 4, SER is referred to the gross Specific Energy Requirement based on the power delivered at the electrodes.

Comparative Example 2

The experiment described in the example 2 was repeated except that the present three-stage plasma reactor system as shown in FIG. 5 was substituted by prior plasma reactor system, in which the coal powder and carrier gas as feedstock was injected into the reaction tube at the top while the same amount of high temperature plasma gas stream was poured into the reaction tube at side surface nearby top, the structure and size of the reaction tube was the same as that of combination of reaction tubes 14, 214 and 314 used in the example 2.

The performances of the two different types of reactor system were listed in below table 5. It is apparent from table 5 by comparison that performances of the three-stage plasma reactor system according to the present invention were much better than that of prior plasma reactor system, even better than that of the two-stage plasma reactor system described in the example 1.

TABLE 5

| Example<br>The type<br>of reactor system | Comparative<br>example 2<br>prior<br>reactor system | Example 2<br>present<br>reactor system |
|---|---|---|
| Acetylene yield, g/100 g coal | 15.2 | 22.9 |
| SER, kWh/kg-$C_2H_2$ | 11.2 | 9.0 |
| Mass Fraction of $C_2H_2$ in Product Stream, wt % | 28.9 | 35.1 |
| Coal Conversion, % | 47.3 | 47.0 |

TABLE 5-continued

| Example The type of reactor system | Comparative example 2 prior reactor system | Example 2 present reactor system |
| --- | --- | --- |
| Heat Flow Rate Loss from Reactor Wall, kW | 1.3 | 1.0 |
| Energy Efficiency % | 74.5 | 82.2 |

In the above table 5, the meaning of SER was the same as that in the table 4; Energy Efficiency was referred to relative amount of heat intake by products steam and cooling water compared to power input.

The terms and expressions which have been employed in this specification are used only as terms and expressions of description and not of limitations, and there is no intention in the use of such terms and expressions to exclude any equivalents of the features shown and described or portions thereof.

Although a few embodiments of the present invention have been shown and described, the present invention is not limited to the described embodiments. Instead, it would be appreciated by those skilled in the art that any changes and modification may be made to these embodiments without departing from the principles and spirit of the invention, the scope of which is defined by the appended claims and their equivalents

The invention claimed is:

1. A multi-stage plasma reactor system with hollow cathodes for cracking carbonaceous material comprising multiple stages, wherein each stage comprises:
a hollow cathode and anode cooled by recycling cooling medium or refrigerant, wherein a chamber is formed between the hollow cathode and the anode, and at least a portion of the hollow cathode is positioned within the inner space of the anode;
at least one working gas inlet for working gas between the outer surface of the hollow cathode or anode and the interior surface of the hollow anode or cathode so the working gas can enter the chamber;
at least one feedstock inlet for carbonaceous material and carrier gas as feedstock located in one end of the hollow cathode or anode going into the chamber, wherein a hollow passage of the hollow cathode or anode is positioned to deliver the carbonaceous material and carrier gas as feedstock and/or volatile caused by pyrolysis which goes through the hollow passage into the chamber via the at least one feedstock inlet of carbonaceous material and carrier gas as feedstock; and
a reaction tube formed by the hollow anode or cathode, the reactor system also comprising:
at least one quench medium inlet of quench medium for quenching or freezing of reaction products located in the lower portion of the last reaction tube; and
at least one outlet of quenched products and gases located on the bottom or lower portion of the last reaction tube;
wherein plasma gas and/or electric arc is generated in the chamber formed between the hollow cathode of the first stage or the hollow cathode of any stage used as the reaction tube of the next highest stage and the hollow anode, the working gas going through the electric arc forming a region between the hollow cathode and anode so as to generate plasma gas which then contacts and mixes with the carbonaceous material and carrier gas as feedstock and/or volatile caused by pyrolysis, entering the chamber by going through the hollow passage of the hollow cathode within or nearby the highest temperature region of the chamber, and pyrolysis of the carbonaceous material and gas-phase reaction of the volatile occurs.

2. The plasma reactor system according to claim 1, wherein the reaction tube which is connected to the hollow cathode of the next lowest stage is connected with and physically separated from the anode by an insulator, while the reaction tube which is connected to the hollow anode of the next lowest stage is directly connected with the anode.

3. The plasma reactor system according to claim 1, wherein the closest horizontal distance between the outer surface of the hollow cathode or any one of the dual hollow cathodes and the interior surface of the anode is from 1 to 400 mm, while the closest distance between the bottom of the outer surface of the hollow cathode or any one of the dual hollow cathodes and the interior surface of the anode is from 1 to 400 mm.

4. The plasma reactor system according to claim 3, wherein the closest distance between the lower end of the outer surface of the hollow cathode or any one of the dual hollow cathodes and the interior surface of the anode is from 1 to 15 mm.

5. The plasma reactor system according to claim 1, wherein the angle formed between an interior surface of a side wall of the anode and that of a bottom wall of the anode is from 90° to 160°.

6. The plasma reactor system according to claim 5, wherein the angle formed between the interior surface of the side wall of the anode and that of the bottom wall of the anode is from 105° to 145°.

7. The plasma reactor system according to claim 1, wherein at least a portion of the outer surface of the hollow cathode, each of the dual hollow cathodes and the hollow anode are cooled by recycling cooling medium or refrigerant with inlets and/or outlets of cooling medium or refrigerant nearby.

8. The plasma reactor system according to claim 1, wherein the lower end of the hollow cathode or anode, annulus gap or innermost hollow passage of the dual hollow cathodes is connected to a material flow distributor so as to adjust the flowing rate or direction of the carbonaceous material and carrier gas as feedstock, volatiles caused by pyrolysis, working gas and/or hot gas preheating the carbonaceous material and carrier gas as feedstock.

9. The plasma reactor system according to claim 1, wherein the temperature of the highest temperature region of the chamber ensures that the temperature of the carbonaceous material entering therein or nearby or into the first reaction tube reaches 650° C. to 1250° C. while the temperature of the highest temperature region of the other chambers ensures that the temperatures of the volatiles caused by pyrolysis after entering the other reaction tubes reaches 1500° C. to 2900° C.

10. The plasma reactor system according to claim 1, wherein the working gases are high temperature plasma gases of hydrogen, nitrogen, methane, and/or inert gas after passing through the electric arc forming region.

11. The plasma reactor system according to claim 1, wherein the cross section of said anode and/or the reaction tube is round, square, elliptic, polygonal or any other regular shape.

12. The plasma reactor system according to claim 1, wherein the cross section surface ratio of the upper end and lower end of the reaction tube is 1/1 to 1/3.

13. The plasma reactor system according to claim 1, wherein the number of feedstock inlets in each stage is 1 to 32, the number of working gas inlets in each stage is 2 to 32, and the number of quench medium inlets in the reactor system is 2 to 64.

14. The plasma reactor system according to claim 13, wherein said working gas inlets and quench medium inlets are symmetrically and/or oppositely arranged in the horizontal direction.

15. The plasma reactor system according to claim 1, wherein the carbonaceous material is selected from the group consisting of coal, coal tar, coal direct liquefaction residue, heavy crude residuum, char, petroleum coke, tar sand, shale oil, carbonaceous industrial wastes or tailings, biomass, synthetic plastic, synthetic polymer, spent tire, municipal solid waste, bitumen, and mixtures thereof.

16. The plasma reactor system according to claim 1, wherein the working gas inlets and/or quench medium inlets are centrally symmetrically arranged in the horizontal direction.

17. A multi-stage plasma reactor system with hollow cathodes for cracking carbonaceous material comprising multiple stages, wherein each stage comprises:
- a hollow cathode and anode cooled by recycling cooling medium or refrigerant, wherein a chamber is formed between the hollow cathode and anode,
- wherein the hollow cathode of the first stage is dual hollow cathodes where one of the dual hollow cathodes lies in the hollow passage of the other dual hollow cathode, an annulus gap is formed between both of the dual hollow cathodes, and at least a portion of the dual hollow cathodes are positioned within the inner space of the hollow anode;
- at least one working gas inlet for working gas between the outer surface of the hollow cathode or anode and the interior surface of the hollow anode or cathode so the working gas can enter the chamber;
- at least one feedstock inlet for carbonaceous material and carrier gas as feedstock located in one end of the hollow cathode or anode going into the chamber, wherein the hollow passage of the hollow cathode or anode, or the annulus gap of the dual hollow cathodes is positioned to deliver the carbonaceous material and carrier gas as feedstock and/or volatiles caused by pyrolysis which goes through the annulus gap or hollow passage into the chamber via the at least one feedstock inlet for carbonaceous material and carrier gas as feedstock; and
- a reaction tube formed by the hollow anode or cathode, the reactor system also comprising:
- at least one quench medium inlet of quench medium for quenching or freezing of reaction products located in the lower portion of the last reaction tube; and
- at least one outlet of quenched products and gases located on the bottom or lower portion of the last reaction tube;

wherein plasma gas and/or electric arc is generated in the chamber formed between the dual hollow cathodes of the first stage or the hollow cathode of any stage used as the reaction tube of the next highest stage and the hollow anode, the working gas going through the electric arc forming a region between the hollow cathode and the anode so as to generate plasma gas which then contacts and mixes with the carbonaceous material and carrier gas as feedstock and/or the volatiles caused by pyrolysis, entering the chamber by going through the annulus gap or the hollow passage of the hollow cathode within or nearby the highest temperature region of the chamber, and pyrolysis of the carbonaceous material and gas-phase reaction of the volatile occurs.

18. The plasma reactor system according to claim 17, wherein the annulus gap or innermost hollow passage of the dual hollow cathode is positioned to deliver the working gas or a hot gas preheating the carbonaceous material and carrier gas as feedstock, wherein the bottom of the annulus gap or innermost hollow passage is the at least one feedstock inlet of the working gas or hot gas preheating the carbonaceous material and carrier gas as feedstock.

19. The plasma reactor system according to claim 18, wherein the hot gas preheating the carbonaceous material and carrier gas as feedstock, entering the annulus gap or innermost hollow passage of the dual hollow cathodes reaches a temperature of 100° C. to 1000° C.

20. The plasma reactor system according to claim 19, wherein the hot gas preheating the carbonaceous material and carrier gas as feedstock is $H_2$, $N_2$, methane, inert gas and/or plasma gases of $H_2$, $N_2$, methane, and/or inert gases.

* * * * *